United States Patent
Frenger et al.

(10) Patent No.: US 10,681,600 B2
(45) Date of Patent: Jun. 9, 2020

(54) WIRELESS DEVICE, RADIO NETWORK NODES AND METHODS PERFORMED THEREIN

(71) Applicant: Telefonaktiebolaget LM Ericsson (publ), Stockholm (SE)

(72) Inventors: Pål Frenger, Linköping (SE); Fredrik Gunnarsson, Linköping (SE); Reza Moosavi, Linköping (SE); Pradeepa Ramachandra, Linköping (SE); Kristina Zetterberg, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 302 days.

(21) Appl. No.: 15/751,508

(22) PCT Filed: Sep. 28, 2017

(86) PCT No.: PCT/SE2017/050945
§ 371 (c)(1),
(2) Date: Feb. 9, 2018

(87) PCT Pub. No.: WO2018/063069
PCT Pub. Date: Apr. 5, 2018

(65) Prior Publication Data
US 2020/0084681 A1    Mar. 12, 2020

Related U.S. Application Data

(60) Provisional application No. 62/401,929, filed on Sep. 30, 2016.

(51) Int. Cl.
*H04W 36/30* (2009.01)
*H04W 36/00* (2009.01)
(Continued)

(52) U.S. Cl.
CPC ......... *H04W 36/0094* (2013.01); *H04W 8/08* (2013.01); *H04W 36/0044* (2013.01);
(Continued)

(58) Field of Classification Search
CPC . H04W 36/0094; H04W 36/26; H04W 36/30; H04W 8/08; H04W 36/0044; H04W 36/38; H04L 5/0048
See application file for complete search history.

(56) References Cited

U.S. PATENT DOCUMENTS

| 2016/0044551 | A1* | 2/2016 | Frenger | H04B 7/0617 370/252 |
| 2017/0230869 | A1* | 8/2017 | Kubota | H04B 7/0695 |
| 2019/0246388 | A1* | 8/2019 | Seo | H04L 5/0082 |

OTHER PUBLICATIONS

Unknown, Author, "Key Principles for Beam Management", 3GPP TSG-RAN WG1 #86, R1-167466, Ericsson, Goteborg, Sweden, Aug. 22-26, 2016, pp. 1-5.
(Continued)

*Primary Examiner* — Lakeram Jangbahadur
(74) *Attorney, Agent, or Firm* — Murphy, Bilak & Homiller, PLLC

(57) ABSTRACT

Embodiments herein relate to a method performed by a wireless device (10) for handling neighbour relationships between radio network nodes in a wireless communication network. The wireless device (10) obtains a request from a first radio network node to provide an identity of a mobility reference signal (MRS) handler associated with one or more MRSs. Furthermore, the wireless device (10) obtains the identity of the MRS handler, which identity is in direct association with at least one MRS out of the one or more MRSs, and reports to the first radio network node, the identity of the MRS handler.

15 Claims, 20 Drawing Sheets

(51) Int. Cl.
  *H04W 8/08* (2009.01)
  *H04W 36/38* (2009.01)
  *H04W 36/26* (2009.01)
  *H04L 5/00* (2006.01)
(52) U.S. Cl.
  CPC .......... *H04W 36/26* (2013.01); *H04W 36/30* (2013.01); *H04W 36/38* (2013.01); *H04L 5/0048* (2013.01)

(56) References Cited

OTHER PUBLICATIONS

Unknown, Author, "Mobility Measurements and Procedures", 3GPP TSG-RAN WG2 #94, Tdoc R2-164001, Ericsson, Nanjing, P.R. China, May 23-27, 2016, pp. 1-5.

Unknown, Author, "Overview of Initial Access and Mobility", TSG-RAN WG1 Meeting #86, R1-167055, Ericsson, Gothenburg, Sweden, Aug. 22-26, 2016, pp. 1-3.

Unknown, Author, "RRM Measurements and Mobility Control in RRC Connected", 3GPP TSG-RAN WG2 #94, Tdoc R2-165540, Ericsson, Gothenburg, Sweden, May 22-26, 2016, pp. 1-3.

* cited by examiner

WIRELESS DEVICE, RADIO NETWORK NODES AND METHODS PERFORMED THEREIN

TECHNICAL FIELD

Embodiments herein relate to a wireless device, radio network nodes and methods performed therein regarding wireless communication. In particular, embodiments herein relate to handling neighbour relationship between the radio network nodes in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node e.g., a Wi-Fi access point or a radio base station (RBS), which in some networks may also be called, for example, a "NodeB" or "eNodeB". The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for communication with user equipments. In a forum known as the Third Generation Partnership Project (3GPP), telecommunications suppliers propose and agree upon standards for present and future networks e.g. UTRAN, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases for e.g. 4$^{th}$ and 5$^{th}$ generation networks. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

The 3GPP is currently working on standardization of the 5th generation (5G) of radio access system, also called New Radio (NR) network. An evolved architecture for the RAN is foreseen, both for the LTE Evolution and the New Radio tracks of 5G. This includes a solution where the radio network nodes such as radio base stations may be split into parts for radio network control, packet processing and radio nodes (RN) with base-band processing and radio units. An example of the new architecture is shown in FIG. 1, indicating possible interfaces and also Radio Control Nodes (RCN) and Packet Processing Node (PPN).

The NR network need to be connected to some core network that provides non-access stratum (NAS) functions and connection to communication networks outside NR, like the internet. This is here shown as a core network as specified by 3GPP.

Existing solutions rely on frequent broadcast of cell identities and other radio area identities from all radio nodes all the time. These identities can then quickly be read by wireless devices in the wireless communication network and be reported to a serving radio network node such as a RCN or RN. The serving radio network node can then identify neighbour cells and radio network nodes.

A proposed solution for downlink based active mode mobility in NR is depicted in FIG. 2. A wireless device is served by the leftmost radio network node but is traveling in the direction towards the rightmost radio network node, depicted by the dashed arrow in the FIG. 2. The wireless device uses a best "home MRS", from the serving radio network node, for coarse timing estimation and radio link quality monitoring and failure detection.

In addition, the wireless device monitors a sparse periodic Mobility Reference Signal (MRS) from the serving radio network node and compares it with similar periodic and sparse MRSs from potential target radio network nodes. When a target radio network node becomes relevant for a more detailed handover procedure additional dynamically configured home MRSs and dynamically configured away MRSs may be activated.

The final handover decision is taken by e.g. the serving radio network node and it is based on wireless device reports containing measurement of home MRSs and away MRSs.

An example embodiment of the proposed system information acquisition for 5G NR is depicted in FIG. 3. In the example each radio network node, such as a Transmission/Reception Point (TRP) or a radio base station e.g. an eNB or gNB, transmits a synchronization signals or a system signature signal (SS). Together with the SS each radio network node also transmits a physical broadcast channel (PBCH) containing some of the minimum system information that the wireless device needs to access the wireless communication network. This part of the minimum system information is denoted as master information block (MIB) in the FIG. 3. In the left oval a SS1 and a MIB1 transmission is used and in the right oval a SS2 and a MIB2 transmission is used. A transition of SSs and the PBCH containing the MIBs is the overlapping part of the ovals.

By reading the MIB the wireless device receives information on how to receive a system information block (SIB) table. The SIB table may be transmitted using a broadcast format such as single frequency network (SFN) transmission and is transmitted over both the ovals. In addition to the minimum system information that is periodically broadcasted in by the SS+MIB and in the SIB-table the wireless device may receive other or additional system information e.g. by a dedicated transmission after initial access is established, depicted as a narrow beam from the right radio network node.

In order for the proposed active mode mobility solution depicted in FIG. 2 to work the serving radio network node needs to know the identity of the neighbouring radio network nodes. If a wireless device reports an away MRS then the serving radio network node needs to know which neighbouring radio network node that is transmitting the MRS.

If the wireless device reports an unknown away MRS then the automatic neighbour relation (ANR) algorithm is supposed to identify the source of the MRS and set up a neighbour relation. In LTE this is done by requesting the wireless device to read the cell global identity (CGI) associated with the measurement and report this global identity to the serving radio network node. The serving radio network node then contacts a server in the wireless communication network and receives an IP-address of the radio network node with said CGI and initiates a neighbour relation setup procedure.

In NR, which is designed to support high gain and dynamic beamforming, e.g. by means of utilizing hundreds of antenna elements at the base station, so called massive Multiple Input Multiple Output (MIMO), this solution may not work. This is depicted in FIG. 4.

In NR a typical situation is that a wireless device reports an unknown "away MRS" but then it cannot read any system information, such as the SS+MIB, of the corresponding radio network node. Therefore, even if we would transmit a CGI in the MIB in NR the ANR algorithm may still fail.

A procedure of "release and redirect" in which the wireless device is released from the serving radio network node with an instruction to connect to the new unknown radio network node and inform the new unknown radio network node about the CGI of the old source radio network node such that the new radio network node may initiate the ANR establishment has been discussed as a solution to this problem. But, as depicted in FIG. 4 it is possible that the wireless device may hear another SS+MIB, dashed transmission of $SS_2$ in the FIG. 4, but it is the wrong one.

If ANR does not work, then the network cannot figure out what an MRS comparison means and a handover cannot be performed, e.g. move the wireless device context, re-direct backhaul traffic, assign contention free PRACH, etc, in time.

Figuring out the SS associated with a particular MRS does not help much since the SS identity (SSI) is not globally unique. We have just moved the problem from the MRS-domain to the SSI-domain. Many nodes in the network transmit $SS_3$ and the radio network node does not know which radio network node sent the $SS_3$. Without a working ANR solution for NR, the active mode mobility solution does not work which leads to a reduced or limited performance of the wireless communication network.

SUMMARY

An object of embodiments herein is to provide a mechanism that improves the performance of the wireless communication network when handling neighbour relationship between radio network nodes.

According to an aspect the object is achieved by providing a method performed by a wireless device for handling neighbour relationships between radio network nodes in a wireless communication network. The wireless device obtains a request from a first radio network node to provide an identity of an MRS handler associated with one or more MRSs. The wireless device further obtains the identity of the MRS handler, which identity is in direct association with at least one MRS out of the one or more MRSs; and reports to the first radio network node, the identity of the MRS handler.

According to another aspect the object is achieved by providing a method performed by a second radio network node for handling neighbour relationships between radio network nodes in a wireless communication network. The second radio network node transmits an identity (ID) of a MRS handler, which identity is in direct association with at least one MRS of the second radio network node.

According to yet another aspect the object is achieved by providing a method performed by a first radio network node for handling neighbour relationships between radio network nodes in a wireless communication network. The first radio network node determines that the first radio network node does not know an identity of a MRS in a received measurement report from a wireless device. The first radio network node further transmits to the wireless device, a request requesting an identity of an MRS handler associated with the identity of the MRS. The first radio network node then receives a response from the wireless device, which response comprises the identity of the MRS Handler. The first radio network node furthermore, transmits a connection request to the MRS handler for connecting to the second radio network node. The first radio network node receives from the MRS handler a connection response with information enabling connection to the second radio network node; and sets up a neighbour relationship with the second radio network node using the received information in the connection response.

It is furthermore provided herein a computer program comprising instructions, which, when executed on at least one processor, cause the at least one processor to carry out any of the methods above, as performed by the first or second radio network node, or the wireless device. It is additionally provided herein a computer-readable storage medium, having stored thereon a computer program comprising instructions which, when executed on at least one processor, cause the at least one processor to carry out the method according to any of the methods above, as performed by the first or second radio network node, or the wireless device.

According to still another aspect the object is achieved by providing a wireless device for handling neighbour relationships between radio network nodes in a wireless communication network. The wireless device is configured to obtain a request from a first radio network node to provide an identity of an MRS handler associated with one or more MRSs. Furthermore, the wireless device is configured to obtain the identity of the MRS handler, which identity is in direct association with at least one MRS out of the one or more MRSs, and to report to the first radio network node, the identity of the MRS handler.

According to yet still another aspect the object is achieved by providing a second radio network node for handling neighbour relationships between radio network nodes in a wireless communication network. The second radio network is configured to transmit an ID of a MRS handler, which identity is in direct association with at least one MRS of the second radio network node.

According to another aspect the object is achieved by providing a first radio network node for handling neighbour relationships between radio network nodes in a wireless communication network. The first radio network node is configured to determine that the first radio network node does not know an identity of an MRS, in a received measurement report from a wireless device, and to transmit to the wireless device, a request requesting an identity of an MRS handler associated with the identity of the MRS. The first radio network node is further configured to receive a response from the wireless device, which response comprises the identity of the MRS Handler. The first radio network node is then configured to transmit a connection request to the MRS handler for connecting to the second radio network node, and to receive from the MRS handler a connection response with information enabling connection to the second radio network node. The first radio network node is then configured to set up a neighbour relationship with the second radio network node using the received information in the connection response.

By transmitting the identity of the MRS handler in direct association with an MRS, any node in the network can identify the origin of a MRS e.g. by receiving the identity from the MRS handler. This is required for automatic neighbour relation setup in a network supporting high gain and dynamic beamforming.

Thus, embodiments herein provide an efficient signaling, which signaling enables neighbour setup that leads to an improved performance of the wireless communication network since the first radio network node will find the second radio network node in an efficient manner.

BRIEF DESCRIPTION OF THE DRAWINGS

Embodiments will now be described in more detail in relation to the enclosed drawings, in which.

DETAILED DESCRIPTION

Figure 1:
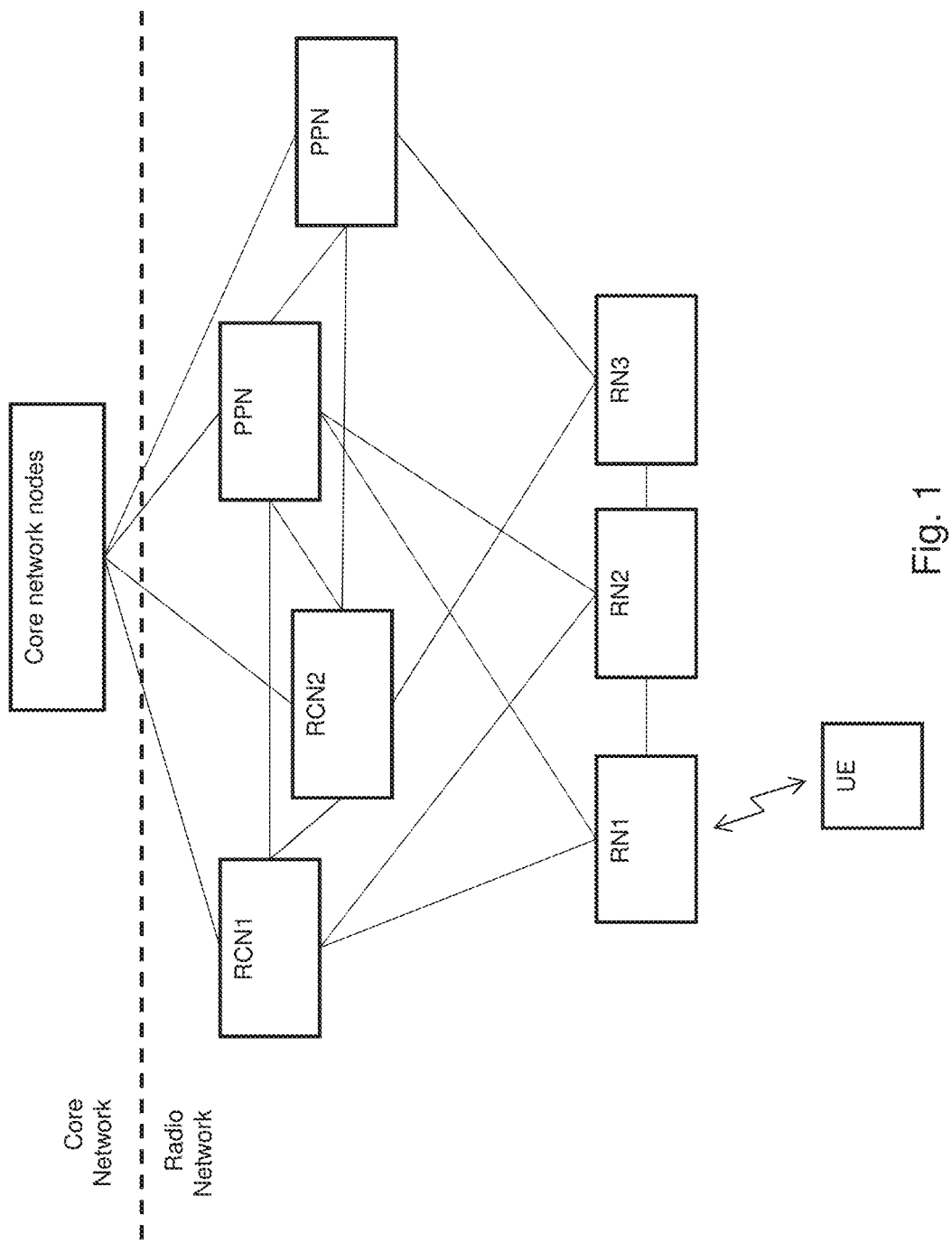
FIG. 1 shows an schematic overview of a network architecture for 3GPP 5G New Radio (NR)
Figure 2:
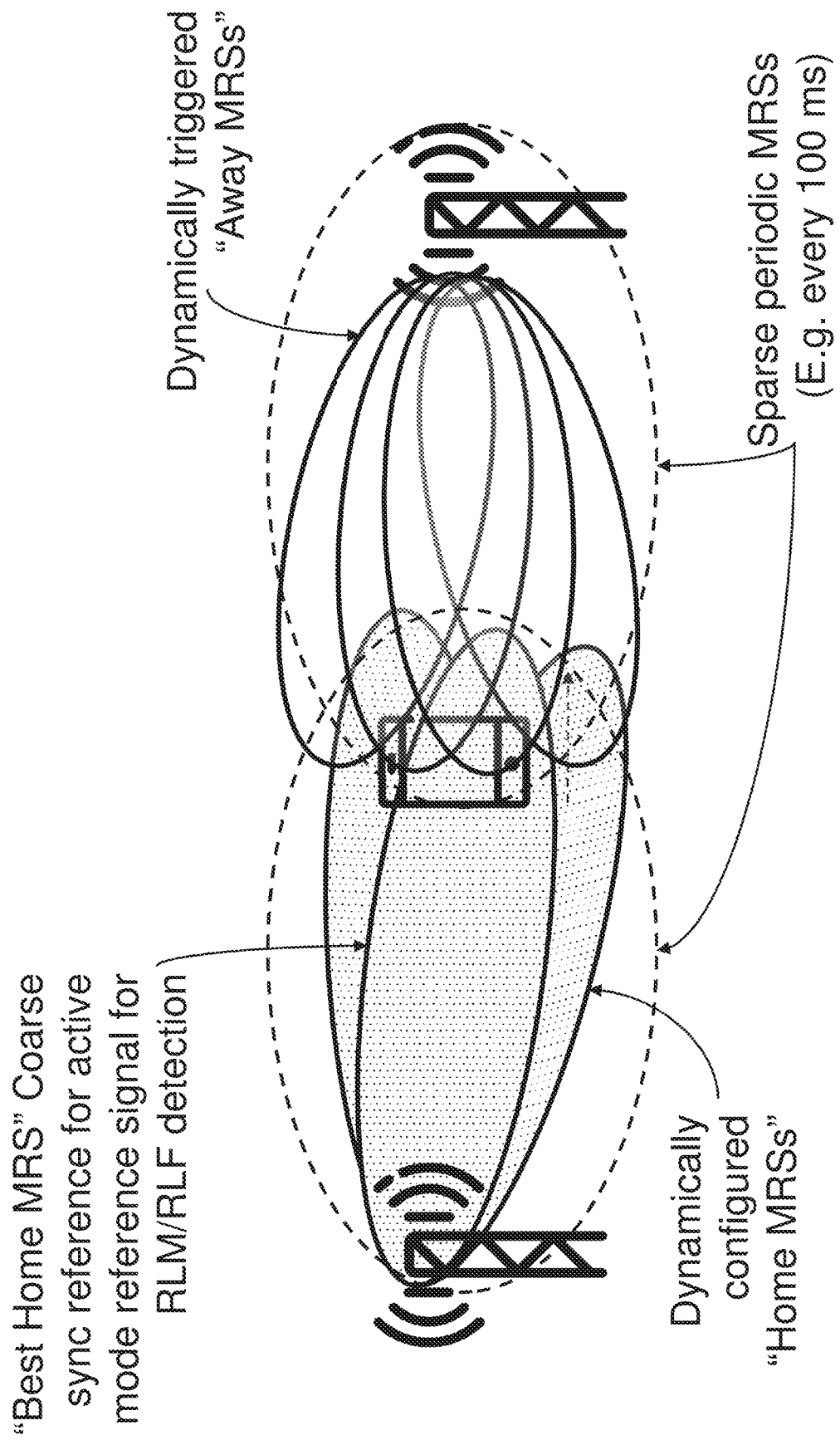
FIG. 2 shows an overview of the downlink based active mode mobility solution for 3GPP 5G New Radio (NR)
Figure 3:
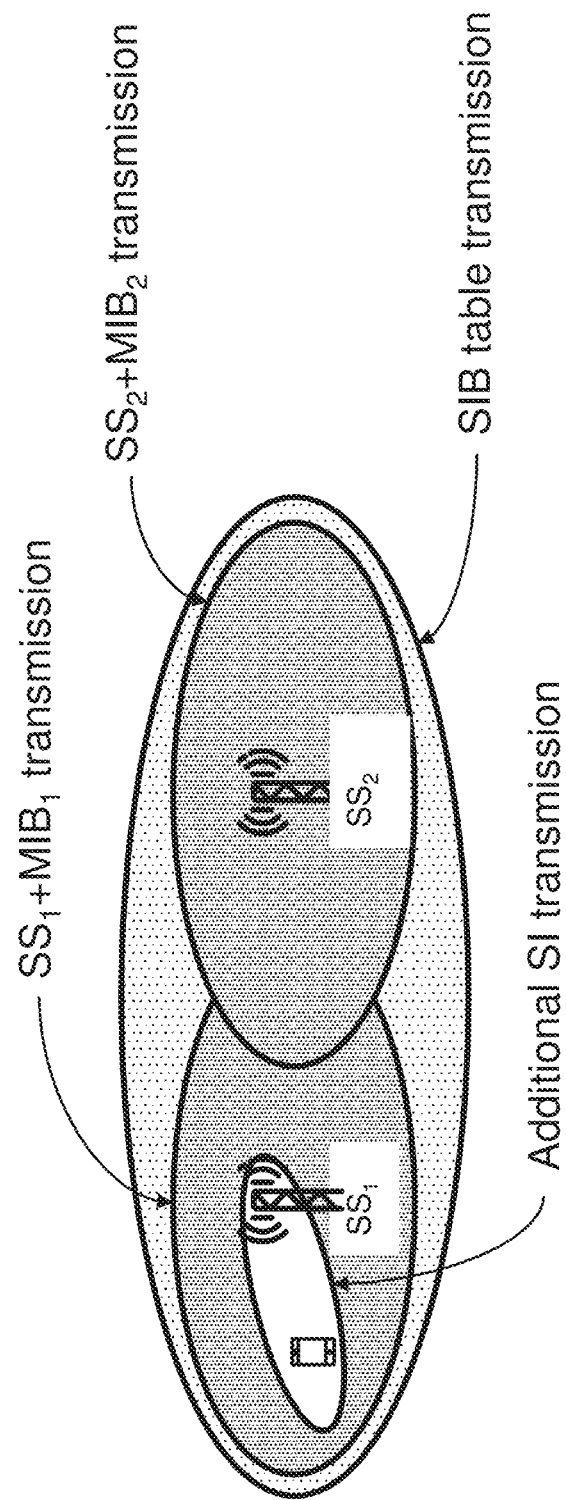
FIG. 3 shows an overview of a solution for system information acquisition in NR.
Figure 4:
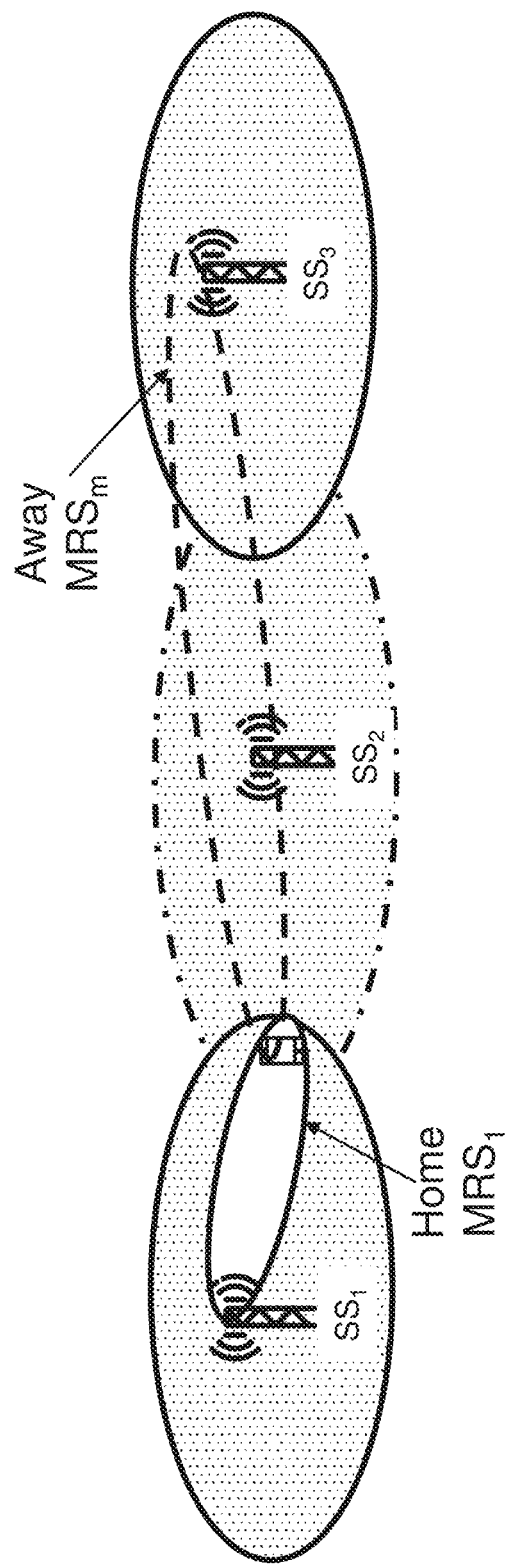
FIG. 4 shows an example depicting a problem identified in prior art.
Figure 5A:
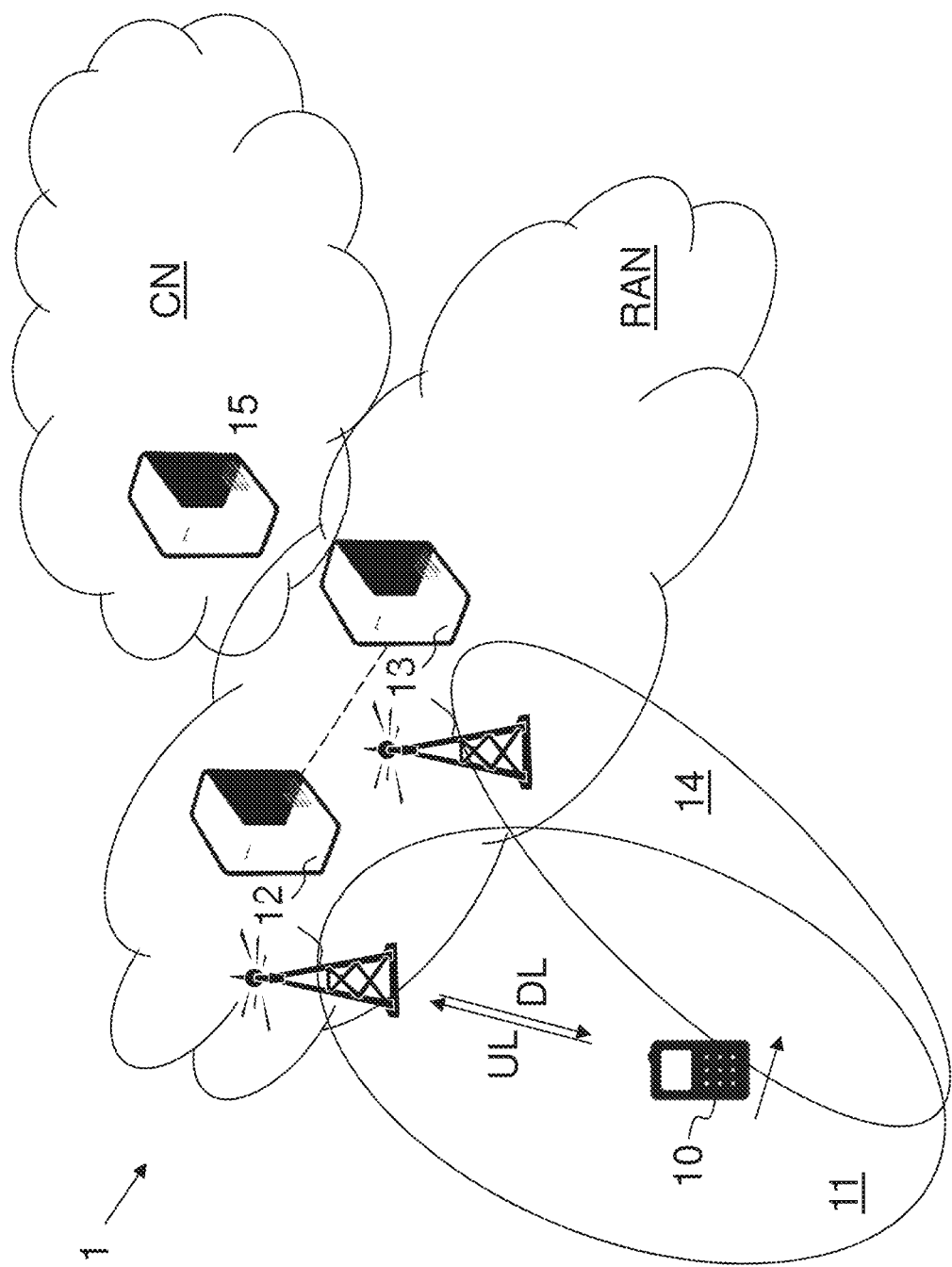
FIG. 5A is a schematic overview depicting a wireless communication network according to embodiments herein.

Embodiments herein relate to wireless communication networks in general. FIG. 5A is a schematic overview depicting a wireless communication network 1. The wireless communication network 1 comprises one or more RANs and one or more CNs. The wireless communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (Wi-Max), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first service area 11, of a first radio access technology (RAT), such as LTE, Wi-Fi, WiMAX or similar. The first radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the first network node 12 depending e.g. on the first radio access technology and terminology used. The first radio network node 12 may alternatively or additionally be a controller node or a packet processing node such as a radio controller node or similar. The first network node may be referred to as a serving network node wherein the first cell may be referred to as a serving cell, and the serving network node communicates with the wireless device 10 in form of DL transmissions to the wireless device 10 and UL transmissions from the wireless device 10.

The wireless communication network 1 further comprises a second radio network node 13 providing radio coverage over a geographical area, a second service area 14, of a second radio access technology (RAT), such as LTE, Wi-Fi, WiMAX or similar. The second radio network node 13 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the first radio access technology and terminology used. The second radio network node 13 may alternatively or additionally be a controller node or a packet processing node such as a radio controller node or similar. The second radio network node 13 may be referred to as a neighbouring network node wherein the second service area may be referred to as a neighbouring cell, and the second radio network node communicates with the wireless device 10 in form of DL transmissions to the wireless device 10 and UL transmissions from the wireless device 10.

It should be noted that a service area may be denoted as cell, beam, beam group or similar to define an area of radio coverage. The first and second RAT may be the same RAT.

The wireless communication network node 1 further comprises a network node 15, also referred to as an MRS handler node, may be any RAN node or core network node such as a Mobility Managing Entity, an Operation and Maintenance node, or similar.

According to embodiments herein an efficient manner of handling or enabling the process of setting up neighbour relationship between the radio network nodes is provided. The first and second radio network nodes each transmits at least one MRS beam. Each MRS-beam is directly associated with a unique identity, preferably a global unique identity (ID), denoted as an identity of a MRS handler or an MRS handler identity, indicating a radio network node responsible for handling MRS IDs. This identity of a MRS handler may e.g. be an identity of the radio network node that transmits the MRS or it may be an identity of a radio network node that knows which radio network node that transmits the MRS. The MRS handler may be any network node that knows which radio network node that is transmitting the MRS and it can e.g. provide the IP-address of that radio network node. The MRS handler may in fact be the same network node that transmits the MRS, i.e. the second radio network node 13, the second radio network node may then provide the IP address of itself.

MRS identities of the MRS beams may be randomized or scrambled in order to avoid over-the-top players to provide positioning services based on signals transmitted from an operator's network. Embodiments herein support this e.g. by coordinating the MRS scrambling pattern in the network node 15 such as the MRS handler node.

Figure 5B:
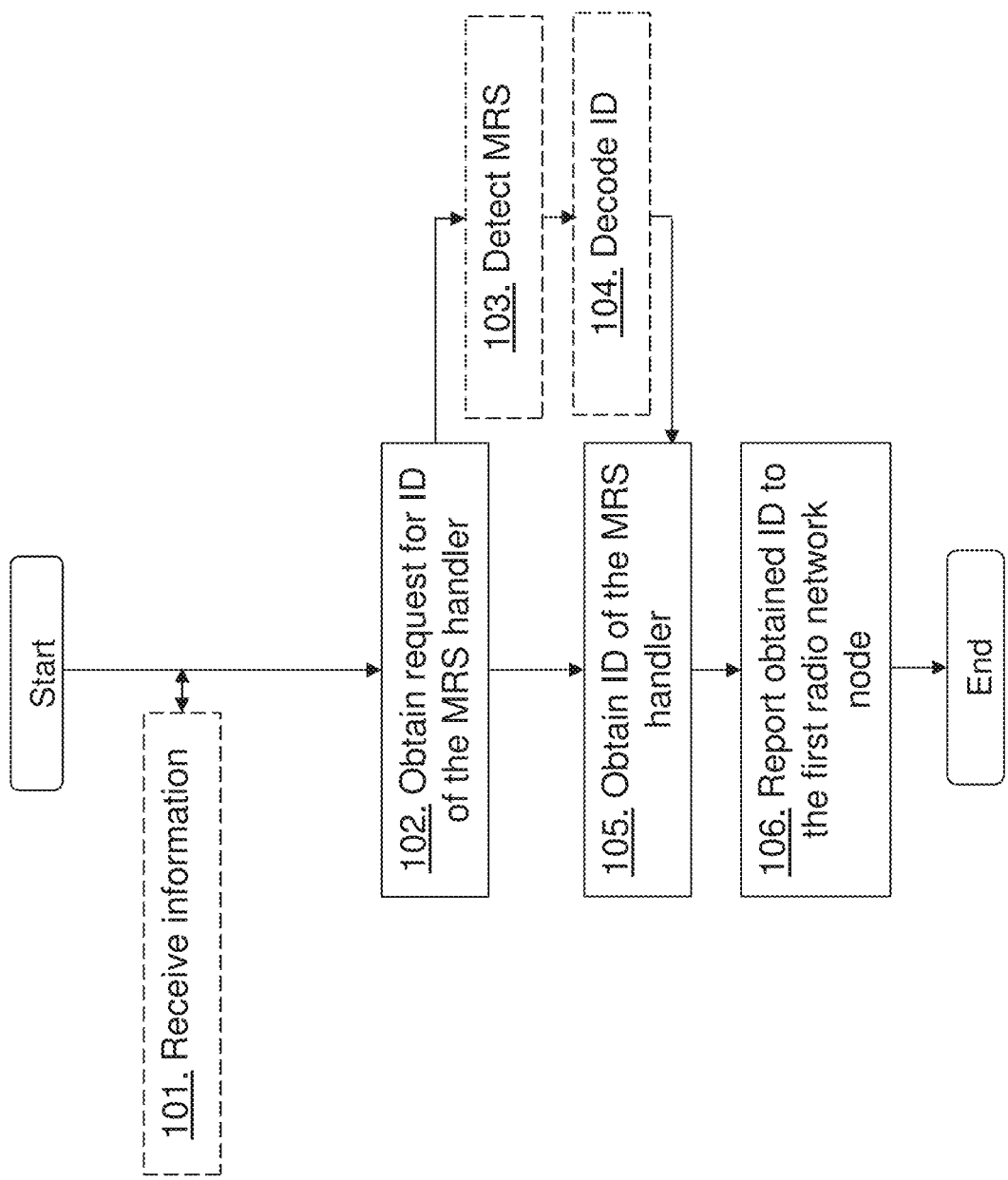
FIG. 5B shows a schematic flowchart depicting a method performed by a wireless device according to embodiments herein.

The method actions performed by the wireless device 10 for handling neighbour relationships between the radio network nodes in the wireless communication network 1 according to some embodiments will now be described with reference to a flowchart depicted in FIG. 5B. The actions do not have to be taken in the order stated below, but may be taken in any suitable order. Actions performed in some embodiments are marked with dashed boxes.

Action 101. The wireless device 10 may receive information about a periodicity of transmission of the identity of the MRS handler and/or transmission times of the identity of the MRS handler.

Action 102. The wireless device obtains, e.g. receives, a request from the first radio network node 12 to provide the identity of the MRS handler associated with one or more MRSs. That is, the MRS handler knows which radio network node that transmits the MRS.

Action 103. The wireless device 10 may in some embodiments detect the at least one MRS out of the one or more MRSs from the second radio network node 13. The at least one MRS may be a reference signal used at least for mobility purposes of wireless devices.

Action 104. The wireless device 10 may further decode the identity of the MRS handler, which identity is in direct association with the detected at least one MRS. The identity of the MRS handler may be in direct association with the at least one MRS in that a physical channel carrying the identity of the MRS handler is using a same beamforming parameters, for a beam out of at least two beams, as the at least one MRS to ensure identical coverage.

Action 105. The wireless device 10 further obtains the identity of the MRS handler, which identity is in direct association with the at least one MRS out of the one or more MRSs.

Action 106. The wireless device 10 reports to the first radio network node, the identity of the MRS handler.

Figure 5C:
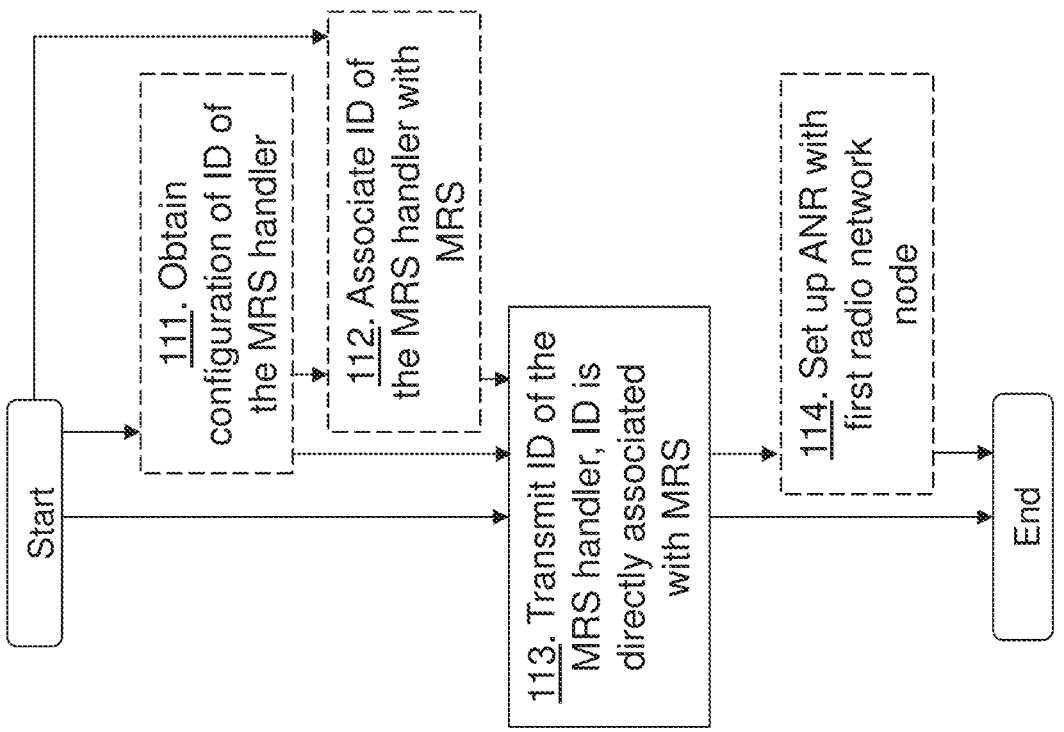
FIG. 5C shows a schematic flowchart depicting a method performed by a second radio network node according to embodiments herein.

The method actions performed by the second radio network node 13 for handling one or more neighbour relationship between the radio network nodes in the wireless communication network 1 according to some embodiments will now be described with reference to a flowchart depicted in FIG. 5C. The actions do not have to be taken in the order stated below, but may be taken in any suitable order. Actions performed in some embodiments are marked with dashed boxes.

Action 111. The second radio network node 13 may obtain a configuration of the identity of the MRS handler, e.g. IDs, transmission parameters such as transmission periodicity etc.

Action 112. The second radio network node 13 may associate, directly, the identity of the MRS handler with the at least one MRS. E.g. set up transmission of the identity of the MRS Handler being in direct association with the at least one MRS as explained below. The MRS may be a reference signal used at least for mobility purposes of wireless devices.

Action 113. The second radio network node 13 transmits the ID of the MRS handler, which identity is in direct association with the at least one MRS of the second radio network node 13. The identity of the MRS handler may be in direct association with the at least one MRS in that the physical channel carrying the identity of the MRS handler is using the same beamforming parameters, for the beam out of the at least two beams, as the at least one MRS to ensure identical coverage. The identity of the MRS handler may be transmitted with a first periodicity being different than a second periodicity of the at least one MRS. The transmission of the identity of the MRS Handler being in direct association with the at least one MRS, may be performed by one or more of the following: an identity of the at least one MRS is used as a demodulation reference signal (DMRS) for the physical channel that contains the identity of the MRS handler; an identity of the at least one MRS is used to derive a scrambling code required for receiving the physical channel that contains the identity of the MRS handler; the at least one MRS provides a time and frequency reference for the physical channel that contains the identity of the MRS handler; and the at least one MRS is used directly as a DMRS for the physical channel that contains the identity of the MRS handler. The identity of the MRS handler may be: a Base station global identity; a cell global identity (CGI); a gNB identity; an eNB identity; a centralized RAN (CRAN)-identity; a Radio network controller ID, an operation and support system (OSS) address; Mobility management entity (MME) ID; or an identity of any other network node in the wireless communication network responsible for knowing the meaning of an identity of the at least one MRS.

Action 114. The second radio network node 13 may further set up an automatic neighbour relationship with the first radio network node 12 upon request from the first radio network node 12.

Figure 5D:
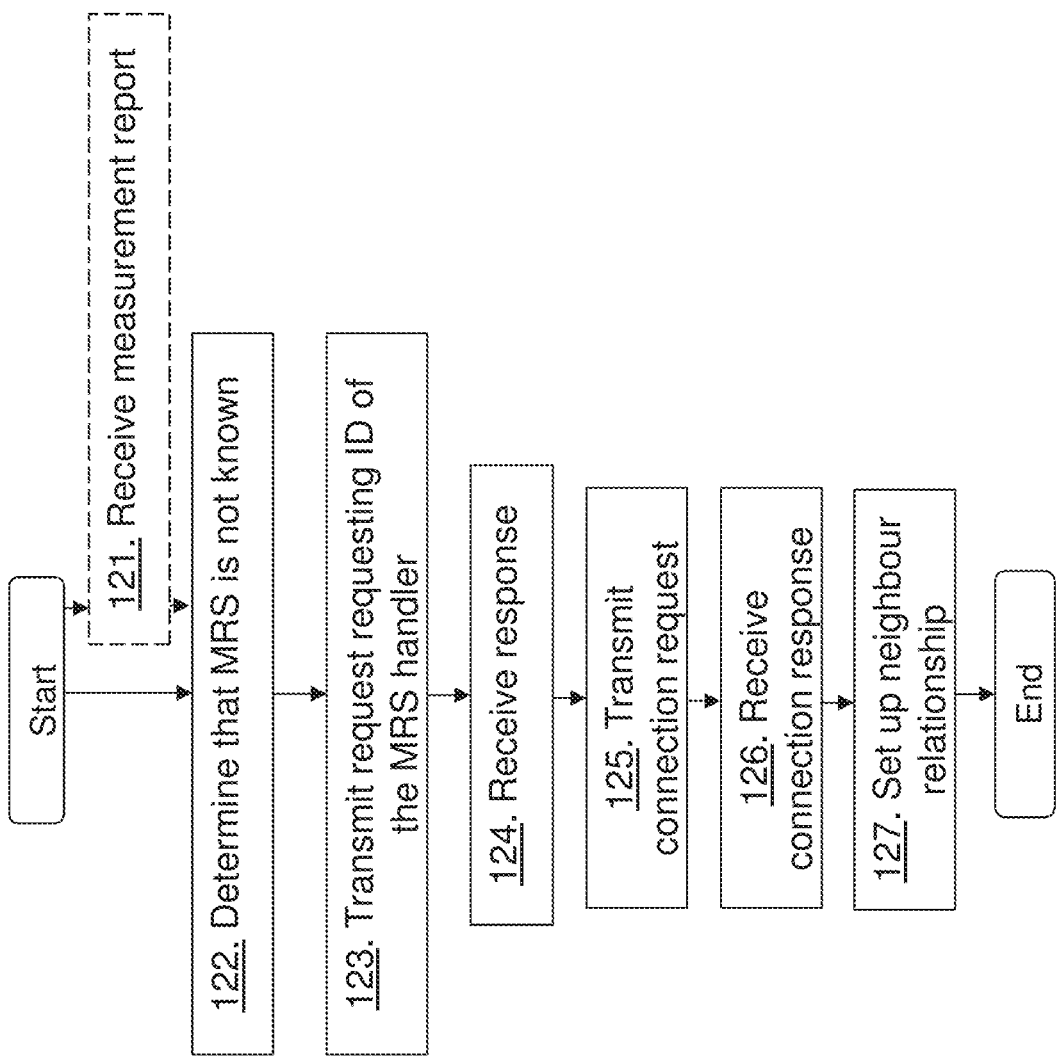
FIG. 5D shows a schematic flowchart depicting a method performed by a first radio network node according to embodiments herein.

The method actions performed by the first radio network node 12 for handling a neighbour relationship between the radio network nodes in the wireless communication network 1 according to some embodiments will now be described with reference to a flowchart depicted in FIG. 5D. The actions do not have to be taken in the order stated below, but may be taken in any suitable order. Actions performed in some embodiments are marked with dashed boxes.

Action 121. The first radio network node 12 may receive the measurement report, which comprises a measurement value and an identity of the MRS for that measurement value. The MRS is a reference signal used at least for mobility purposes of wireless devices.

Action 122. The first radio network node 12 determines that the first radio network node does not know an identity of the MRS in a received measurement report from the wireless device 10.

Action 123. The first radio network node 12 transmits to the wireless device 10, the request requesting the identity of the MRS handler associated with the identity of the MRS.

Action 124. The first radio network node 12 further receives the response from the wireless device 10, which response comprises the identity of the MRS Handler.

Action 125. The first radio network node 12 transmits the connection request to the MRS handler for connecting to the second radio network node 13.

Action 126. The first radio network node 12 receives from the MRS handler a connection response with information enabling connection to the second radio network node 13.

Action 127. The first radio network node 12 further sets up a neighbour relationship with the second radio network node 13 using the received information in the connection response.

Figure 6:
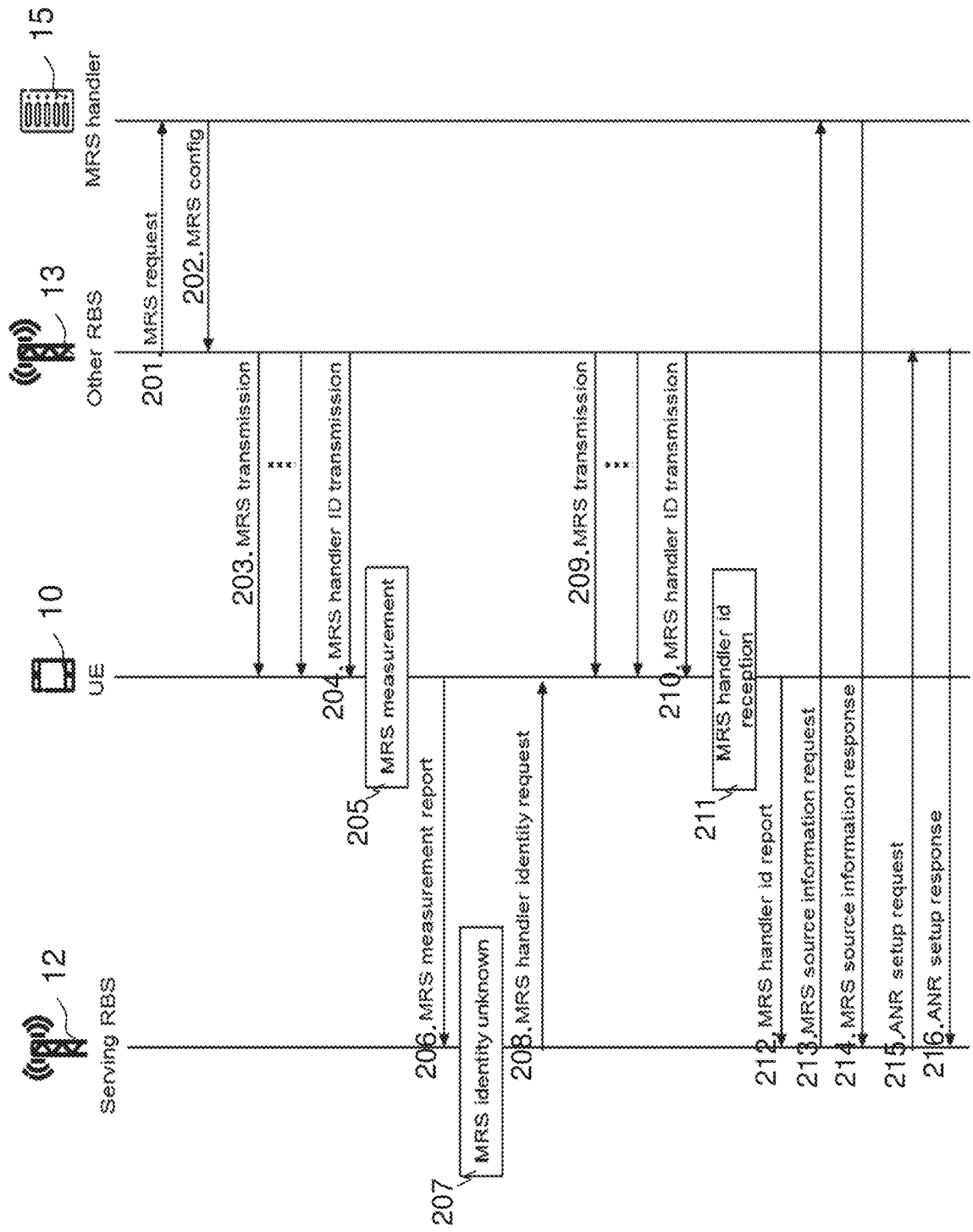
FIG. 6 shows a combined flowchart and signaling scheme according to embodiments herein.

FIG. 6 is a combined flowchart and signaling scheme according to embodiments herein. FIG. 6 shows an example depicting a procedure utilizing the transmission, from a non-serving radio network node, the identity of the MRS handler and the associated reporting of said identity of the MRS handler by the wireless device 10 that enables an automatic neighbour relation establishment.

Action 201. The second radio network node 13 transmits a MRS request to the network node 15, such as the MRD Handler.

Action 202. The network node 15 transmits an ID configuration of the MRS handler to the second radio network node 13 requesting the MRS.

Action 203. The second radio network node 13 then transmits, to the wireless device 10, one or more MRS transmissions over the second service area 14. The MRS transmissions may further carry a respective MRS identity.

Action 204. According to embodiments herein the second radio network node 13 transmits, to the wireless device 10, the identity of the MRS handler in a MRS handler ID transmission in direct association with the transmitted one or more MRSs. For example, the physical channel carrying the identity of the MRS handler is using the same beamforming parameters, for the beam out of the at least two beams, as the at least one MRS to ensure identical coverage.

Action 205. The wireless device 10 may then measure signal strength or quality of the one or more MRS.

Action 206. The wireless device 10 may further transmit, to the first radio network node 12, a measurement report that may be denoted MRS measurement report. The measurement report indicates the measured signal strength of the one or more MRSs and the MRS identity of the one or more MRSs. The MRS identities may be locally unique identities. Furthermore, the MRS identities may be short identities e.g. 3 bits for efficient signalling.

Action 207. The first radio network node 12 receives the measurement report and determines that the first radio network node 12 does not know or recognize the MRS identity in the measurement report.

Action 208. The first radio network node 12 then transmits a request, also referred to as a MRS handler ID request, to the wireless device 10. The request requests the identity of an MRS handler associated with the MRS identity.

Action 209. The second radio network node 13 may continue to transmit the one or more MRS transmissions to the wireless device 10.

Action 210. The second radio network node 13 further transmits the MRS handler ID in direct association with the MRS transmissions.

Action 211. Thus, the wireless device 10 further receives and detects the MRS identity in a MRS transmission, which MRS ID is requested by the first radio network node 12 in action 208. Furthermore, the wireless device 10 decodes and retrieves the ID of the MRS handler in direct association with the MRS transmission.

Action 212. The wireless device 10 transmits to the first radio network node a MRS handler ID report indicating the identity of the MRS handler associated with the MRS identity of the one or more MRS transmissions. Thus, the first radio network node 12 receives a response from the wireless device which response comprises the identity of the MRS Handler.

Action 213. The first radio network node may locate or find, from the MRS handler ID, the network node 15 and may transmit to the network node 15 a MRS source information request. The MRS source information request requests information regarding the second radio network node 13 transmitting the MRS in the measurement report.

Action 214. The network node 15 responds with location information e.g. IP address of the second radio network node 13.

Action 215. The first radio network node 12 may then transmit an ANR setup request to the second radio network node 13.

Action 216. The second radio network node 13 may then transmit an ANR setup response e.g. confirming the setup of the connection and neighbour relationship.

In FIG. 6 it is depicted the operation of the ANR algorithm in accordance with some embodiments herein. The wireless device 10 may read and report the MRS handler identity upon request and report to the serving radio network node 12. The serving radio network node 12 handles the ANR setup after that.

Figure 7:
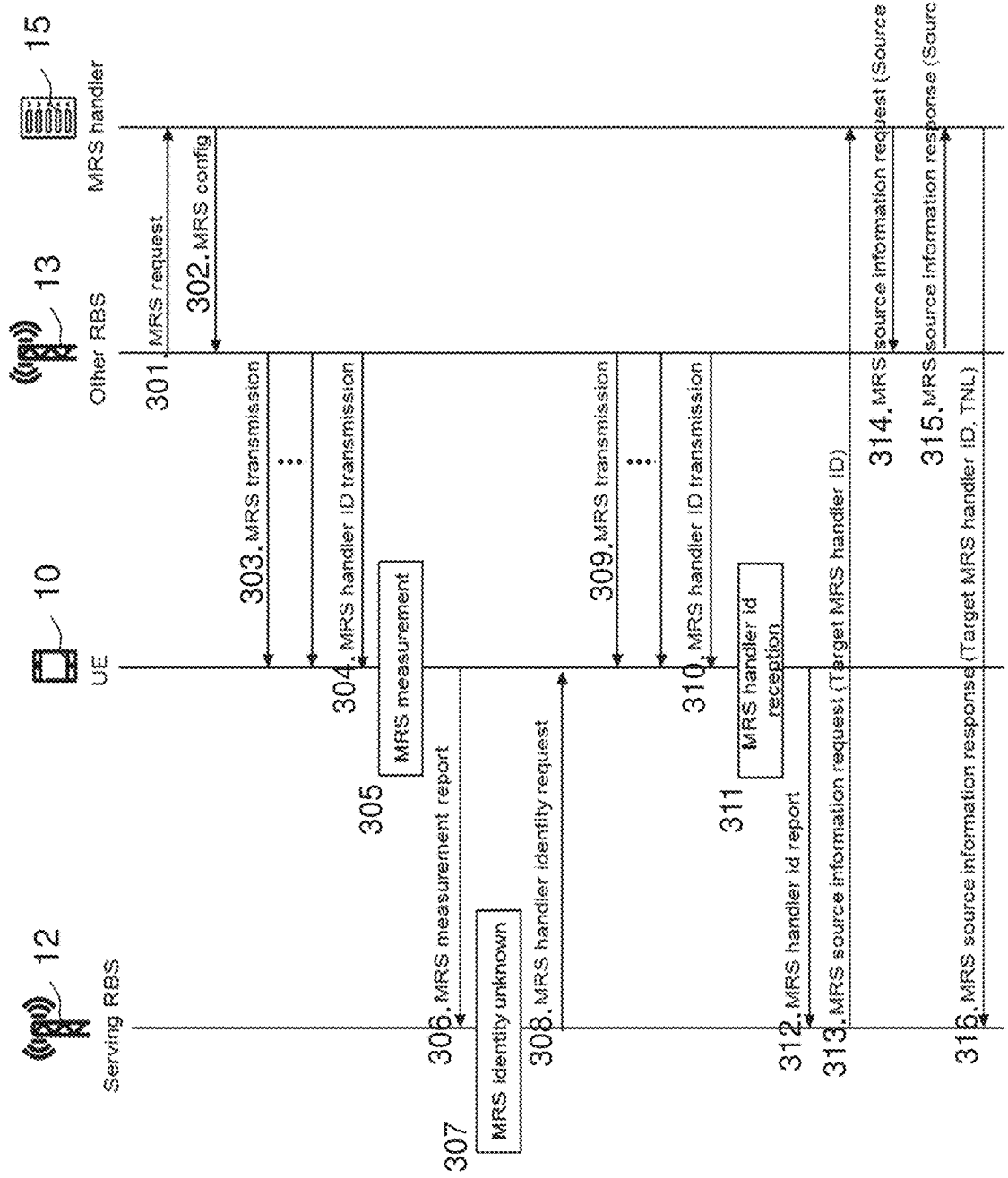
FIG. 7 shows a combined flowchart and signaling scheme according to embodiments herein.

FIG. 7 is a combined flowchart and signaling scheme according to some embodiments herein. FIG. 7 shows an example of an ANR procedure with an MRS handler as a router.

Action 301. The second radio network node 13 transmits an MRS request to the network node 15, such as the MRS Handler.

Action 302. The network node 15 transmits an ID configuration of the MRS handler to the second radio network node 13 requesting the MRS.

Action 303. The second radio network node 13 then transmits, to the wireless device 10, one or more MRS transmissions over the second service area 14. The MRS transmissions may further carry an MRS identity.

Action 304. According to embodiments herein the second radio network node 13 transmits, to the wireless device 10, the identity of the MRS handler in a MRS handler ID transmission in direct association with the transmitted one or more MRSs.

Action 305. The wireless device 10 then measures signal strength or quality of the one or more MRS.

Action 306. The wireless device 10 then transmits, to the first radio network node 12, a measurement report that may be denoted MRS measurement report. The measurement report indicates the measured signal strength of the one or more MRSs and the MRS identity of the one or more MRSs, which MRS identities are locally unique identities. The MRS identities may be e.g. short identities such as 3 bits for efficient signalling.

Action 307. The first radio network node 12 receives the measurement report and determines that the first radio network node 12 does not know or recognize the MRS identity in the measurement report.

Action 308. The first radio network node 12 then transmits a request also referred to as a MRS handler ID request to the wireless device 10. The request requests the identity of an MRS handler associated with the MRS identity.

Action 309. The second radio network node 13 continues transmitting the one or more MRS transmissions to the wireless device 10.

Action 310. The second radio network node 13 further transmits the MRS handler ID in direct association with the MRS transmissions.

Action 311. Thus, the wireless device 10 further receives and detects the MRS identity in a MRS transmission, which MRS ID is requested by the first radio network node 12 in action 208. Furthermore, the wireless device 10 decodes and retrieves the ID of the MRS handler in direct association with the MRS transmission.

Action 312. The wireless device 10 transmits to the first radio network node an MRS handler ID report indicating the identity of the MRS handler associated with the MRS identity of the one or more MRS transmissions. Thus, the first radio network node 12 receives a response from the wireless device 10 which response comprises the identity of the MRS Handler.

Action 313. The first radio network node 12 locates or finds, from the MRS handler ID, the network node 15 and transmits to the network node 15 a MRS source information request. The MRS source information request requests information regarding the second radio network node 13 transmitting the MRS in the measurement report.

Action 314. The network node 15 transmits to the second radio network node 13 a MRS source information request e.g. with a source MRS Handler ID. The MRS source information request requests information regarding the second radio network node 13 transmitting the MRSs.

Action 315. The second radio network node 13 transmits to the network node 15 an MRS source information response e.g. with the source MRS Handler ID and a Transport Network Layer (TNL).

Action 316. The network node 15 transmits to the first radio network node 12 a MRS source information response e.g. with the target MRS Handler ID and the TNL.

ANR may also be implemented with an MRS handler that routes messages between radio network nodes using an MRS handler ID as a key as seen in FIG. 7. This means that once a source RBS, e.g. first radio network node 12, has obtained the MRS handler ID associated to the unknown MRS from the wireless device 10, it can send an MRS source information request including the target MRS handler ID to the MRS handler, which routes the message onwards etc.

Furthermore, a method performed by a second radio network node for handling neighbour relationships between radio network nodes in a wireless communication network I herein provided. The second radio network node 13 transmits the ID of the MRS handler in direct association with one or more MRS of the second radio network node 13. That the ID of the MRS Handler is or is transmitted in direct association with the one or more MRS may be performed by one or more of the following: an identity of an MRS is used as the DMRS for the physical channel that contains the ID of the MRS handler; the identity of the MRS is used to derive the scrambling code required for receiving the physical channel that contains the ID of the MRS handler; the MRS provides the time and frequency reference for the physical channel that contains the ID of the MRS handler; and the MRS is used directly as the DMRS for the physical channel that contains the ID of the MRS handler. The ID of the MRS handler may be e.g. a Base station global identity, a cell global identity (CGI), a gNB identity, an eNB identity, a centralized RAN (CRAN)-identity, a Radio network controller ID, an operation and support system (OSS) address, Mobility management entity (MME) ID, or an identity of any other network node in the wireless communication network responsible for knowing the meaning of the MRS identity. The MRS handler is a network node, such as a core network node, O&M node, or a RAN node, that knows which radio network node that is transmitting the MRS and it can e.g. provide the IP-address of that radio network node. The MRS handler may in fact be the same network node that transmits the MRS, i.e. the second radio network node, the second radio network node may then provide the IP address to itself.

The second radio network node may obtain a configuration of the identity of the MRS handler from the MRS handler. The second radio network node may associate the identity of the MRS handler with the one or more MRSs.

Furthermore, a method performed by the wireless device for handling neighbour relationships between radio network nodes in a wireless communication network is herein provided. The wireless device obtains the request from the first radio network node 12 to provide the ID of the MRS handler associated with one or more MRSs. The wireless device 10 may then detect a MRS out of the one or more MRSs from the second radio network node 13 and decode the identity of the MRS handler in direct association with the detected one or more MRSs. This identity of the MRS handler is then reported to the first radio network node 12.

The wireless device 10 may previously receiving or obtaining the request receive the one or more MRSs of the second radio network node 13 and the identity of a MRS handler in direct association with the received one or more MRSs. The wireless device 10 may then measure signal strength or quality of the received one or more MRSs and may transmit a measurement report to the first radio network node 12 serving the wireless device 10. The measurement report indicates the measured signal strength or quality and identity of the one or more MRSs.

Furthermore, a method performed by the first radio network node 12 for handling neighbour relationships between radio network nodes in the wireless communication network 1 is herein provided. The first radio network node 12 determines that the first radio network node does not know an MRS identity in a received measurement report from a wireless device. The first radio network node 12 further transmits to the wireless device 10, the request requesting identity of an MRS handler associated with the MRS identity. The first radio network node 12 receives the response from the wireless device 10, which response comprises the identity of the MRS Handler. The first radio network node then transmits a connection request to the MRS handler for connecting to the second radio network node 13, and receives from the MRS handler the connection response with information enabling connection to the second radio network node. The first radio network node 12 then sets up a neighbour relationship with the second radio network node using the received information in the connection response.

The serving first radio network node 12 may e.g. receive the measurement report, which comprises a measurement value and the MRS ID for that measurement value. MRS IDs are only locally unique, and hence, comprises a small number of bits in order to enable low cost reporting over the air. The much longer global identity of the MRS handler is not used in normal active mode operation. The serving first radio network node 12 only receives the MRS handler identity on explicit request.

Figure 8:
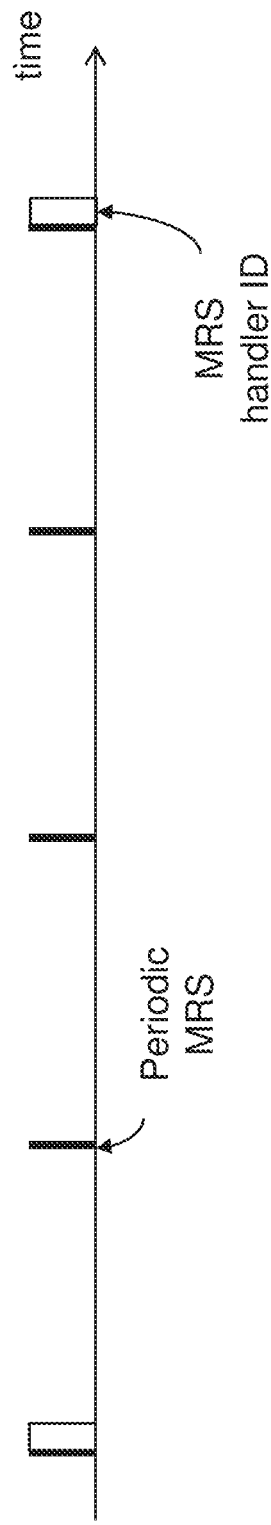
FIG. 8 shows an embodiment depicting how an MRS handler identity may be transmitted in association with a MRS.

An illustration of an example embodiment is depicted in FIG. 8. Periodically after N MRS transmissions, e.g. 3 transmissions, a new physical channel carrying the MRS handler identity is inserted. This physical channel is transmitted using the same beamforming parameters as the associated MRS to ensure identical coverage. Thus, FIG. 8 shows an example depicting how an identity of the MRS handler or an MRS handler identity may be transmitted and being in direct association with a MRS.

Figure 9:
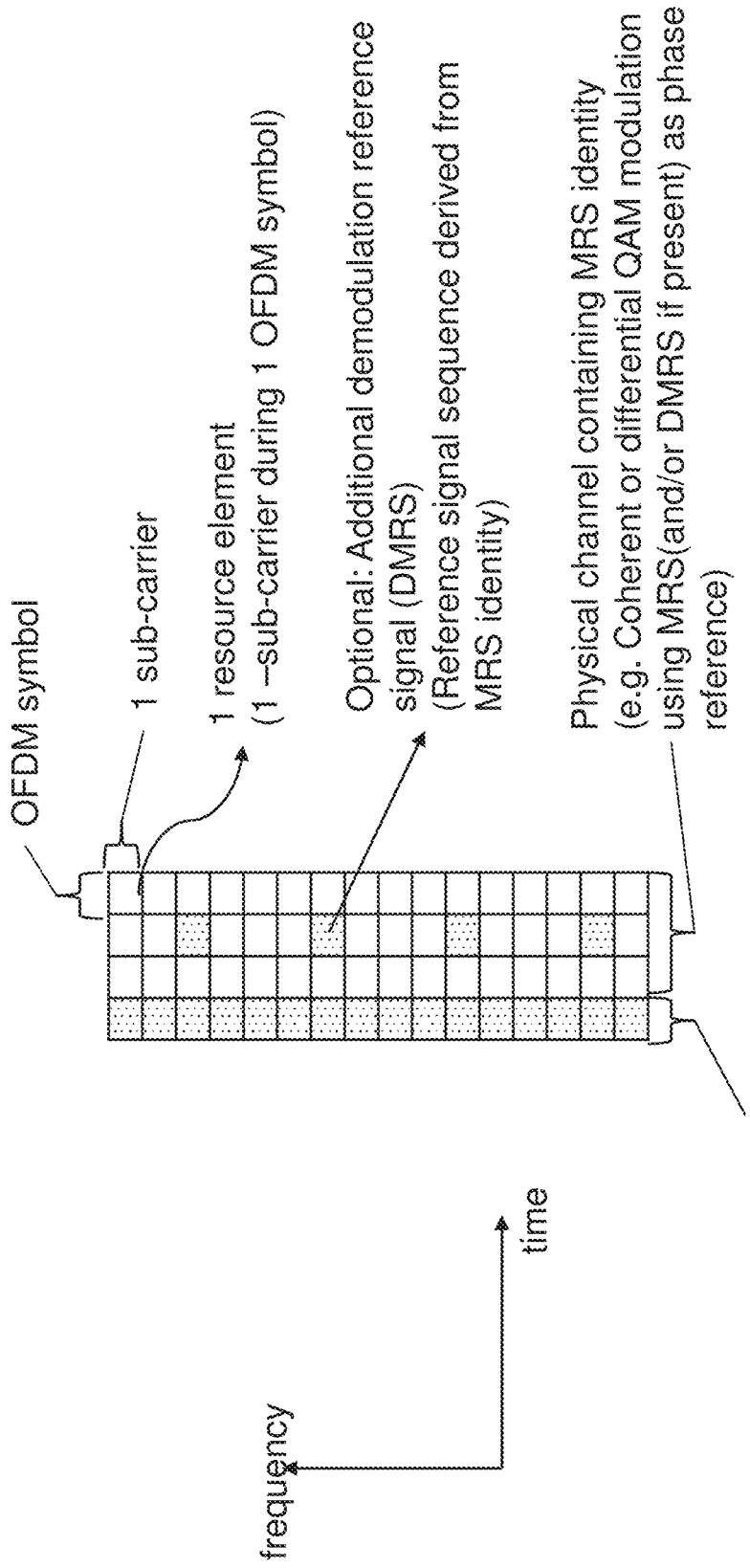
FIG. 9 shows an example depicting a possible design of a physical channel that carries an MRS handler identity.

An example embodiment of how said physical channel for transmitting the MRS handler identity may be designed is depicted in FIG. 9. The MRS is used as a reference signal for the physical channel that follows directly after it (in this example). A resource element (RE) is a subcarrier during an OFDM symbol. The MRS e.g. a sequence modulation, which may comprise a primary part and a secondary part is thus followed by a physical channel comprising or containing the identity of the MRS handler, e.g. coherent of differential Quadrature Amplitude Modulation (QAM) using MRS, and/or Demodulation Reference signal (DMRS) if present, as phase reference. Additionally, additional DMRS may be added, which is a reference signal sequence derived from the MRS identity. FIG. 9 depicts a possible design of a physical channel that carries the MRS handler identity.

In one embodiment, the ID of the MRS handler is scrambled using the MRS identity. The MRS identity may be an index of an MRS sequence code.

In another embodiment, the ID of the MRS handler is transmitted using the MRS identity for cyclic redundancy checks. The MRS identity may be the index of the MRS sequence code.

Figure 10:
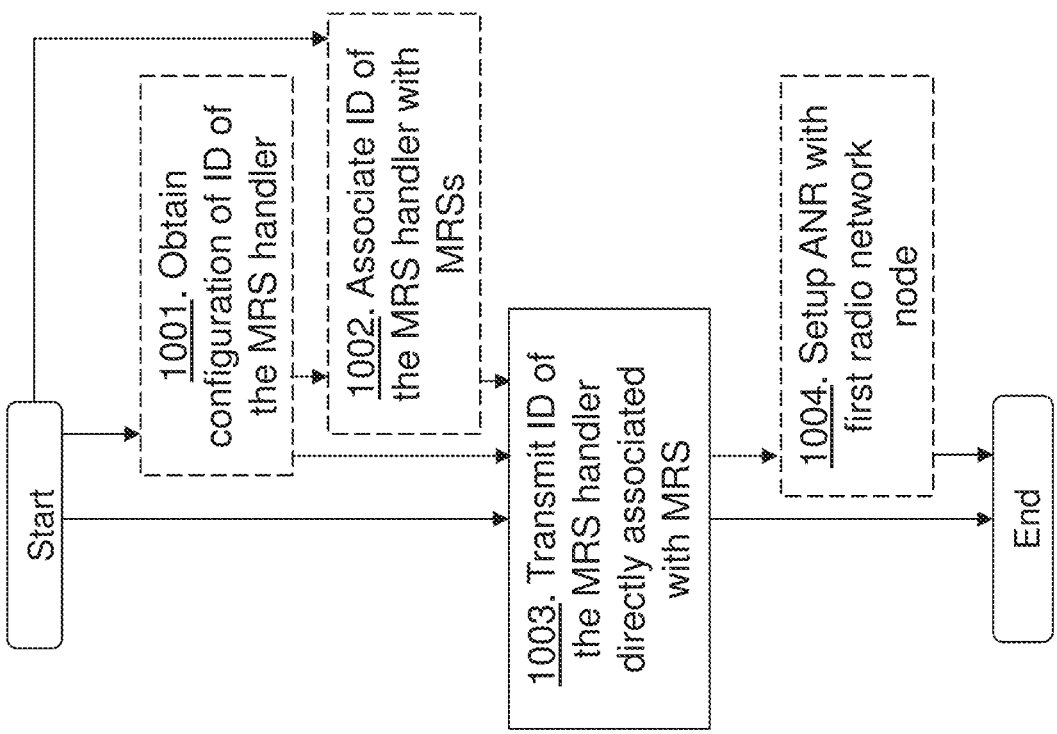
FIG. 10 shows a schematic flowchart depicting a method performed by a second radio network node according to embodiments herein.

The method actions performed by the second radio network node 12 for handling neighbour relationship between the radio network nodes in the communication network 1 according to some embodiments will now be described with reference to a flowchart depicted in FIG. 10. The actions do not have to be taken in the order stated below, but may be taken in any suitable order. Actions performed in some embodiments are marked with dashed boxes.

Action 1001. The second radio network node 13 may obtain e.g. retrieve the configuration of the identity of the MRS handler from the MRS handler. The second radio network node 13 may obtain the MRS handler ID configuration from the network node (e.g. from the MRS handler, OSS, MME, etc).

Action 1002. The second radio network node 13 may associate the ID of the MRS handler with the one or more MRS. Thus, the ID of the MRS handler is directly associated the one or more MRSs. This may be done in one or more of the following ways: an identity of an MRS is used as a DMRS for a physical channel that contains the ID of the MRS handler; the identity of the MRS is used to derive a scrambling code required for receiving a physical channel that contains the ID of the MRS handler; the MRS provides a time and frequency reference for a physical channel that contains the ID of the MRS handler; and the MRS is used directly as a demodulation reference signal (DMRS) for a physical channel that contains the ID of the MRS handler.

Action 1003. The second radio network node transmits the ID of the MRS handler in direct association with one or more MRS of the radio network node. For the direct association see action 1002. The ID of the MRS handler may be e.g. a Base station global identity, a cell global identity (CGI), a gNB identity, an eNB identity, a centralized RAN (CRAN)-identity, a Radio network controller ID, an operation and support system (OSS) address, Mobility management entity (MME) ID, or an identity of any other network node in the wireless communication network responsible for knowing the meaning of the MRS identity. Each MRS-beam is associated with a (preferably globally unique) identity, the MRS handler ID, indicating the responsible node. This MRS handler identity may e.g. be the identity of the base station that transmits the MRS of it may be an identity of a node that knows who transmits the MRS.

The MRS handler is a network node, such as a core network node, O&M node, or a RAN node, that knows which radio network node that is transmitting the MRS and it can e.g. provide the IP-address of that radio network node. The MRS handler may in fact be the same network node that transmits the MRS, i.e. the second radio network node, the second radio network node may then provide the IP address to itself by transmitting the IP address of the second radio network node 13 to the first radio network node 12 upon receiving a MRS request from the first radio network node 12.

For example, the ID of the MRS handler is associated to an ID scope that can be a mobility antenna beam, a transmission point, a set of transmission points, a radio base station etc. This ID scope is supported by one or more mobility antenna beams, and each mobility antenna beam is configured with an MRS to be transmitted, either periodically or aperiodically. The configured MRS can be statically, semi-statically or dynamically selected. The ID of the MRS handler is configured to be transmitted in mobility antenna beams of the ID scope, in direct association to one or more MRS(s).

Action 1004. The second radio network node 13 may then setup a neighbour relationship with the first radio network node 12.

Figure 11:
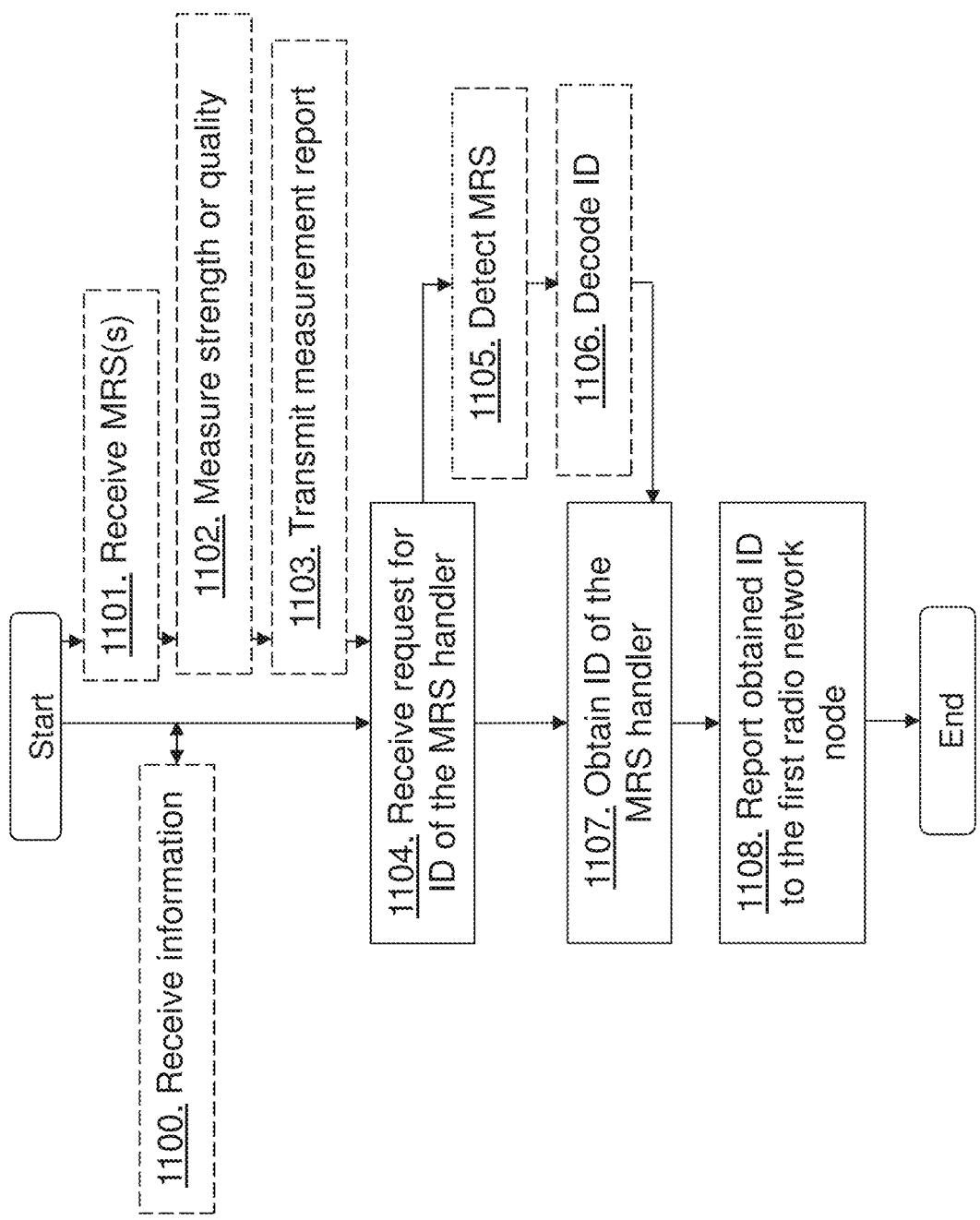
FIG. 11 shows a schematic flowchart depicting a method performed by a wireless device according to embodiments herein.

The method actions performed by the wireless device 10 for handling neighbour relationship between the radio network nodes in the communication network 1 according to some embodiments will now be described with reference to a flowchart depicted in FIG. 11. The actions do not have to be taken in the order stated below, but may be taken in any suitable order. Actions performed in some embodiments are marked with dashed boxes.

Action 1100. The wireless device 10 may receive information about a periodicity of the MRS handler ID, transmission times, etc.

Action 1101. The wireless device 10 may, before receiving or obtaining the request in action 1104 below, receive the one or more MRSs from the second radio network node 13.

Action 1102. The wireless device 10 may then measure signal strength or quality of the received one or more MRSs.

Action 1103. The wireless device 10 may transmit the measurement report to the first radio network node 12 serving the wireless device 10. The measurement report indicates the measured signal strength or quality and identity of the one or more MRSs. Thus, the wireless device 10 reports a measurement on an MRS. This report only includes a much shorter MRS identity and an associated measurement value of the MRS. The MRS handler identity may not be included into the measurement report.

Action 1104. The wireless device 10 receives the request from the first radio network node 12 to provide the identity of the MRS handler associated with the MRS. The wireless device may e.g. receive the request from first radio network node 12 to decode the ID of the MRS handler associated to one or more MRS(s). The wireless device 10 thus receives a request to read and report the identity of an MRS handler associated with a particular MRS identity.

Action 1105. The wireless device 10 may then receive and detect the MRS out of one or more MRSs from the second radio network node 13. The wireless device 10 may detect the MRS indicated in the received request, from a set of configured one or more MRS(s).

Action 1106. The wireless device 10 may e.g. attempt to decode the ID of the MRS handler in direct association to the detected MRS.

Action 1107. The wireless device 10 obtains the identity of the MRS handler directly associated with the requested MRS. The wireless device 10 may obtain the ID of the MRS handler by decoding the ID of the MRS handler in direct association with the received MRS or retrieving the ID of the MRS handler stored in a memory previously decoded from the MRS.

Action 1108. The wireless device 10 then reports the obtained identity of the MRS handler to the first radio network node 12. Optionally, the wireless device 10 may report the ID of the MRS handler to the first radio network node 12, or logs the ID of the MRS handler in an internal storage.

Figure 12:
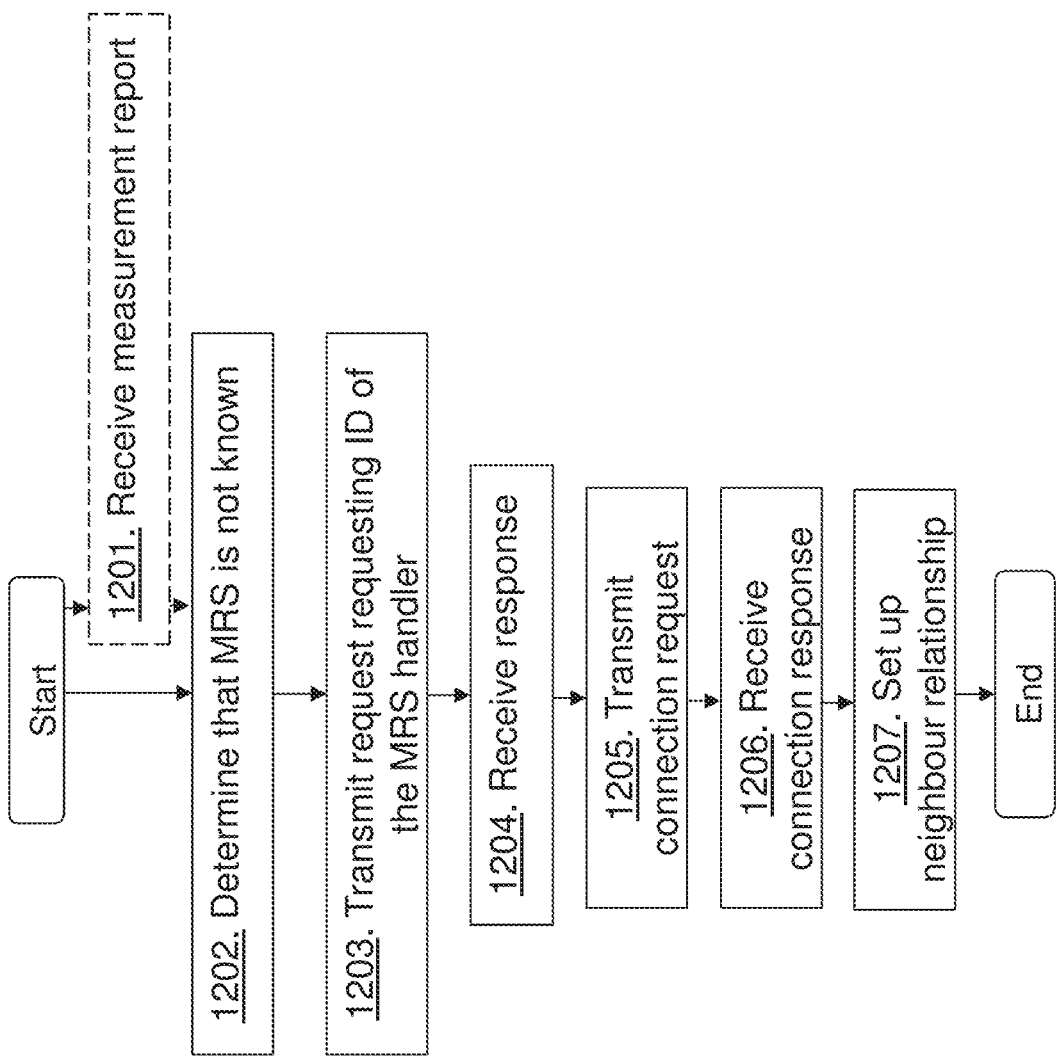
FIG. 12 shows a schematic flowchart depicting a method performed by a first radio network node according to embodiments herein.

The method actions performed by the first radio network node 12 for handling neighbour relationship between the radio network nodes in the communication network 1 according to some embodiments will now be described with reference to a flowchart depicted in FIG. 12. The actions do not have to be taken in the order stated below, but may be taken in any suitable order. Actions performed in some embodiments are marked with dashed boxes.

Action 1201. The first radio network node 12 may receive, from the wireless device 10, the measurement report with a measurement value and a MRS identity, wherein the MRS identity is a locally unique identity.

Action 1202. The first radio network node 12 determines that the first radio network node 12 does not know or recognize the MRS identity in the received measurement report from the wireless device 10.

Action 1203. The first radio network node 12 then, in response to determine that the MRS ID is not known, transmits to the wireless device 10, the request requesting the identity of the MRS handler associated with the MRS identity.

Action 1204. The first radio network node 12 receives the response from the wireless device 10, which response comprises the identity of the MRS Handler.

Action 1205. The first radio network node 12 then transmits the connection request to the MRS handler for connecting to the second radio network node.

Action 1206. The first radio network node 12 then receives from the MRS handler the connection response with information enabling connection to the second radio network node 13.

Action 1207. The first radio network node 12 then sets up a neighbour relationship with the second radio network node using the received information in the connection response.

Figure 13:
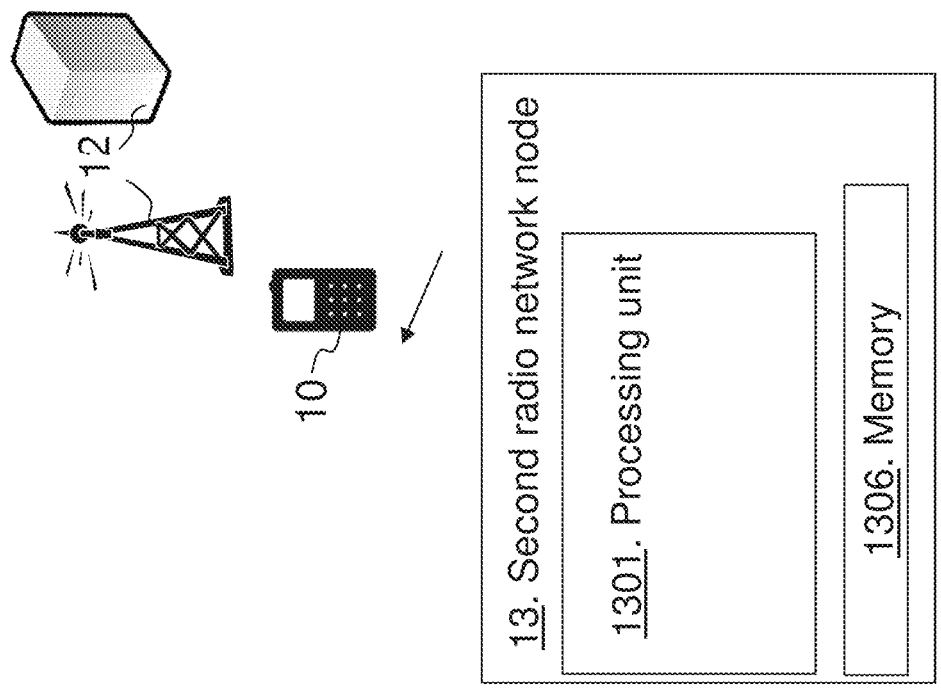
FIG. 13 is a block diagram depicting a second radio network node according to embodiments herein.
Figure 13:
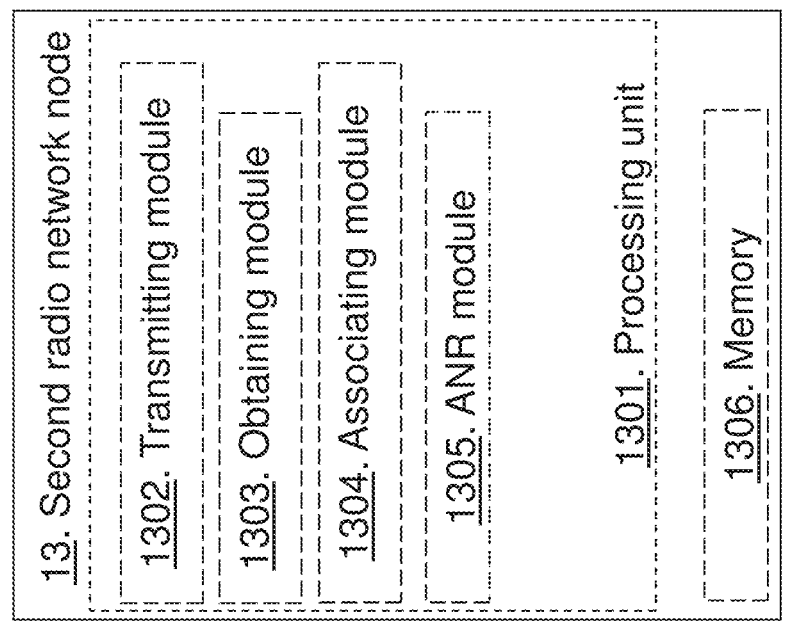
Figure 13:
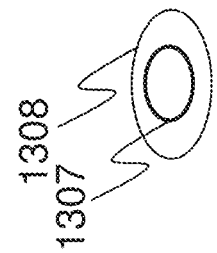

FIG. 13 is a block diagram depicting the second radio network node 13, in two embodiments, for handling neighbour relationships between radio network nodes in the wireless communication network according to embodiments herein.

The second radio network node 13 may comprise a processing unit 1301, e.g. one or more processors, configured to perform the methods herein.

The second radio network node 13 may comprise a transmitting module 1302, e.g. a transmitter or a transceiver. The second radio network node 13, the processing unit 1301, and/or the transmitting module 1302 is configured to transmit the ID of the MRS handler, which identity is in direct association with at least one MRS of the second radio network node, e.g. configured to transmit the ID of the MRS handler in direct association with one or more MRS of the second radio network node. That the identity of the MRS handler is in direct association with the at least one MRS means that the physical channel carrying the identity of the MRS handler is using the same beamforming parameters, for the beam out of the at least two beams, as the at least one MRS to ensure identical coverage. The MRS is a reference signal used at least for mobility purposes of wireless devices. The second radio network node 13, the processing unit 1301, and/or the transmitting module 1302 may be configured to transmit the identity of the MRS handler with the first periodicity being different than a second periodicity of the at least one MRS. The second radio network node 13, the processing unit 1301, and/or the transmitting module 1302 may be configured to transmit the identity of the MRS Handler being in direct association with the at least one MRS, by one or more of the following: an identity of the at least one MRS is used as a demodulation reference signal, DMRS, for a physical channel that contains the identity of the MRS handler; an identity of the at least one MRS is used to derive a scrambling code required for receiving a physical channel that contains the identity of the MRS handler; the at least one MRS provides a time and frequency reference for a physical channel that contains the identity of the MRS handler; and the at least one MRS is used directly as a DMRS for a physical channel that contains the identity of the MRS handler. The identity of the MRS handler may be: a Base station global identity; a cell global identity, CGI; a gNB identity; an eNB identity; a centralized RAN, CRAN,-identity; a Radio network controller ID, an operation and support system, OSS, address; Mobility management entity, MME, ID; or an identity of any other network node in the wireless communication network responsible for knowing the meaning of an identity of the at least one MRS.

The second radio network node 13 may comprise an obtaining module 1303. The second radio network node 13, the processing unit 1301, and/or the obtaining module 1303 may be configured to obtain a configuration of the identity of the MRS handler, e.g. obtain, e.g. retrieve, from the MRS handler, OSS, MME, etc.

The second radio network node 13 may comprise an associating module 1304. The second radio network node 13, the processing unit 1301, and/or the associating module 1304 may be configured to associate, directly, the identity of the MRS handler with the at least one MRS. This may be done in one or more of the following ways: an identity of an MRS is used as a DMRS for a physical channel that contains the ID of the MRS handler; the identity of the MRS is used to derive a scrambling code required for receiving a physical channel that contains the ID of the MRS handler; the MRS provides a time and frequency reference for a physical channel that contains the ID of the MRS handler; and the MRS is used directly as a demodulation reference signal (DMRS) for a physical channel that contains the ID of the MRS handler.

The second radio network node 13 may comprise an ANR module 1305. The second radio network node 13, the processing unit 1301, and/or the ANR module 1305 may be configured to set up an automatic neighbour relationship with the first radio network node upon request from the first radio network node.

The second radio network node 13 further comprises a memory 1306. The memory comprises one or more units to be used to store data on, such as signal strengths or qualities, MRSs, IDs of MRS handlers, applications to perform the methods disclosed herein when being executed, and similar.

The methods according to the embodiments described herein for the second radio network node 13 are respectively implemented by means of e.g. a computer program 1307 or a computer program product, comprising instructions, i.e., software code portions, which, when executed on at least one processor, cause the at least one processor to carry out the actions described herein, as performed by the second radio network node 13. The computer program 1307 may be stored on a computer-readable storage medium 1308, e.g. a disc or similar. The computer-readable storage medium 1308, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

Figure 14:
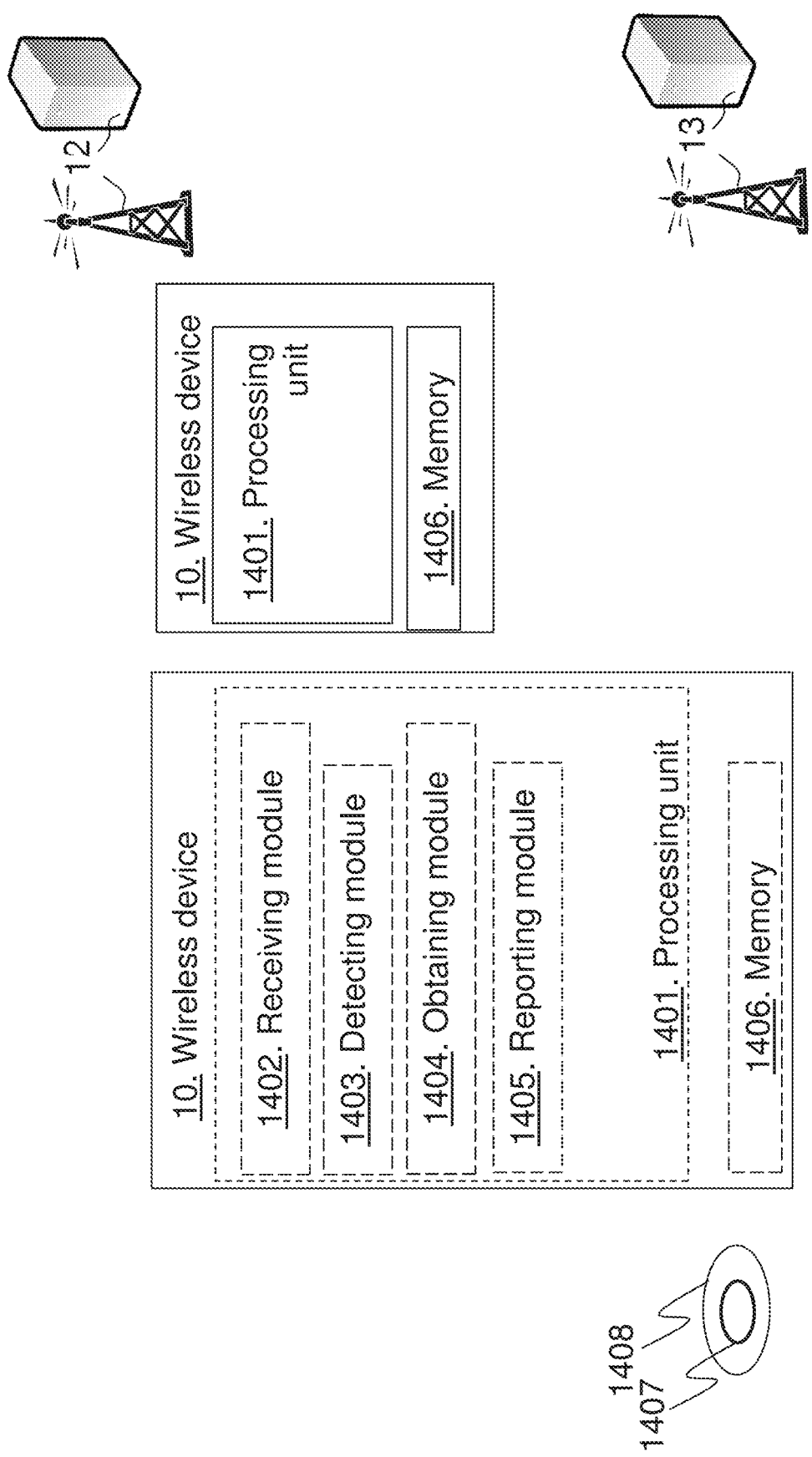
FIG. 14 is a block diagram depicting a wireless device according to embodiments herein.

FIG. 14 is a block diagram depicting the wireless device 10, in two embodiments, for handling neighbour relationships between radio network nodes in the wireless communication network 1 according to embodiments herein.

The wireless device 10 may comprise a processing unit 1401, e.g. one or more processors, configured to perform the methods herein.

The wireless device 10 may comprise a receiving module 1402, e.g. a receiver or a transceiver. The wireless device 10, the processing unit 1401, and/or the receiving module 1402 is configured to obtain, e.g. receive, the request from the first radio network node 12 to provide the identity of a mobility reference signal, MRS, handler associated with one or more MRSs. The wireless device 10, the processing unit 1401, and/or the receiving module 1402 may be configured to obtain the request from first radio network node 12 to decode the ID of the MRS handler associated to one or more MRS(s). The wireless device 10, the processing unit 1401, and/or the receiving module 1402 may be configured to receive information about the periodicity of transmission of the identity of the MRS handler and/or transmission times of the identity of the MRS handler. The wireless device 10, the processing unit 1401, and/or the receiving module 1402 may thus be configured to receive information about the periodicity of the MRS handler ID, transmission times, etc. The wireless device 10, the processing unit 1401, and/or the receiving module 1402 may be configured to receive a request to read and report the identity of an MRS handler associated with a particular MRS identity.

The wireless device 10 may comprise a detecting module 1403. The wireless device 10, the processing unit 1401, and/or the detecting module 1403 may be configured to detect the at least one MRS out of the one or more MRSs from a second radio network node, e.g. detect the MRS indicated in the received request, from a set of configured one or more MRS(s). The at least one MRS is a reference signal used at least for mobility purposes of wireless devices. The wireless device 10, the processing unit 1401, and/or the detecting module 1403 may be configured to receive and detect the MRS out of one or more MRSs from the second radio network node.

The wireless device 10 may comprise an obtaining module 1404. The wireless device 10, the processing unit 1401, and/or the obtaining module 1404 is configured to obtain the identity of the MRS handler, which identity is in direct association with at least one MRS out of the one or more MRSs, e.g. obtain the identity of the MRS handler associated with the requested MRS. That the identity of the MRS handler is in direct association with the at least one MRS means that a physical channel carrying the identity of the MRS handler is using the same beamforming parameters, for the beam out of the at least two beams, as the at least one MRS to ensure identical coverage. The wireless device 10, the processing unit 1401, and/or the obtaining module 1404 may be configured to obtain the ID of the MRS handler by decoding the ID of the MRS handler in direct association with the received MRS or retrieving the ID of the MRS handler stored in a memory previously decoded from the MRS. The wireless device 10, the processing unit 1401, and/or the obtaining module 1404 may be configured to attempt to decode the ID of the MRS handler in direct association to the detected MRS. The wireless device 10, the processing unit 1401, and/or the obtaining module 1404 may be configured to decode the identity of the MRS handler, which identity is in direct association with the detected at least one MRS.

The wireless device 10 may comprise a reporting module 1405, e.g. a transmitter or a transceiver. The wireless device 10, the processing unit 1401, and/or the reporting module 1405 is configured to report to the first radio network node 12, the identity of the MRS handler, e.g. report the obtained identity of the MRS handler to the first radio network node 12. The wireless device 10, the processing unit 1401, and/or the reporting module 1405 may be configured to report the ID of the MRS handler to the first radio network node 12, or to log the ID of the MRS handler in an internal storage.

The wireless device 10 further comprises a memory 1406. The memory comprises one or more units to be used to store data on, such as signal strengths or qualities, MRSs, IDs of MRS handlers, applications to perform the methods disclosed herein when being executed, and similar.

The methods according to the embodiments described herein for the wireless device 10 are respectively implemented by means of e.g. a computer program 1407 or a computer program product, comprising instructions, i.e., software code portions, which, when executed on at least one processor, cause the at least one processor to carry out the actions described herein, as performed by the wireless device 10. The computer program 1407 may be stored on a computer-readable storage medium 1408, e.g. a disc or similar. The computer-readable storage medium 1408, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Figure 15:
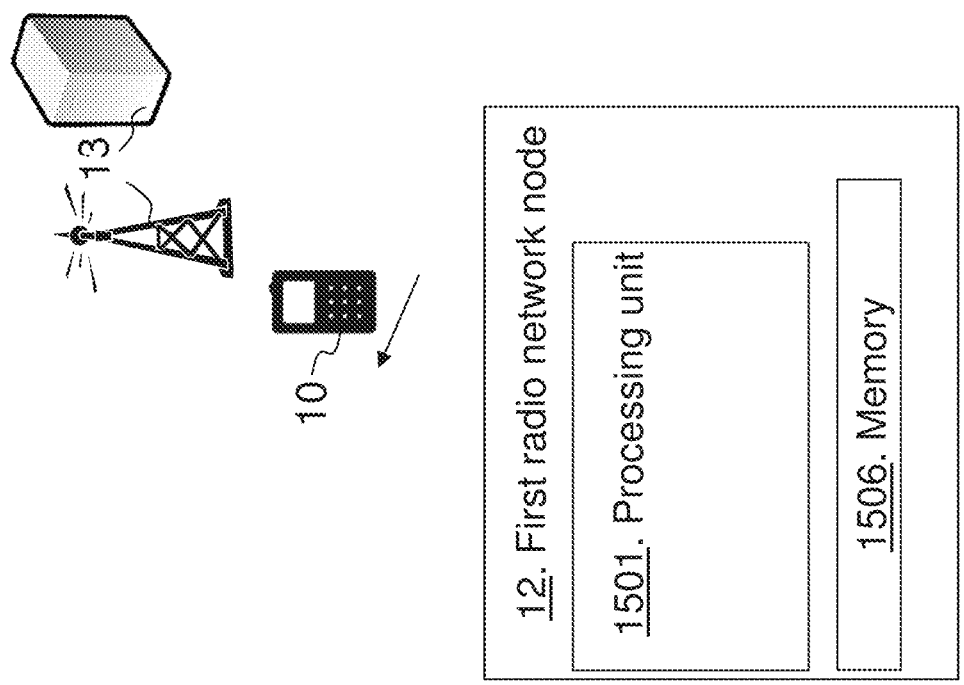
FIG. 15 is a block diagram depicting a first radio network node according to embodiments herein.
Figure 15:
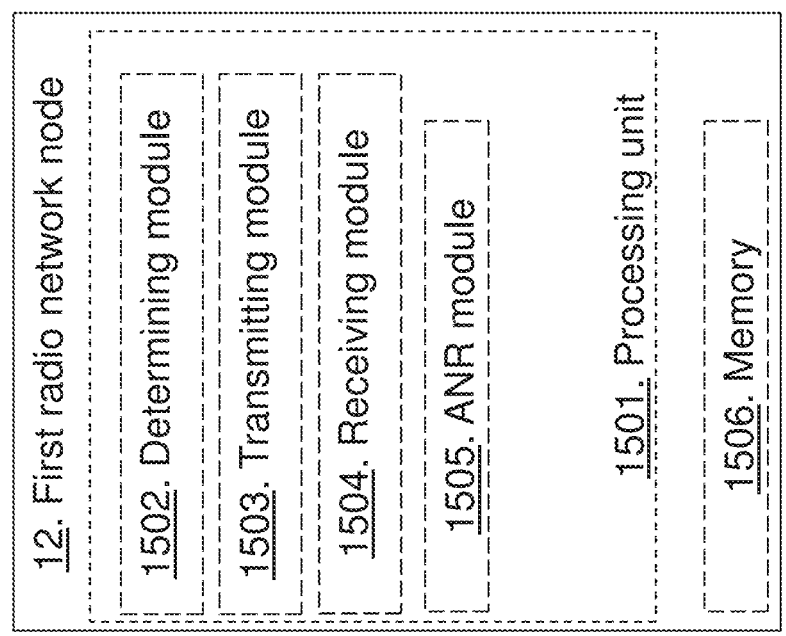

FIG. 15 is a block diagram depicting the first radio network node 12, in two embodiments, for handling neighbour relationships between radio network nodes in the wireless communication network according to embodiments herein.

The first radio network node 12 may comprise a processing unit 1501, such as one or more processors, configured to perform methods herein.

The first radio network node 12 may comprise a determining module 1502. The first radio network node 12, the processing unit 1501, and/or the determining module 1502 is configured to determine that the first radio network node 12 does not know or recognize the identity of the MRS in the received measurement report from the wireless device 10.

The first radio network node 12 may comprise a transmitting module 1503, such as a transmitter or transceiver. The first radio network node 12, the processing unit 1501, and/or the transmitting module 1503 is configured to transmit, in response to determine that the MRS ID is not known, to the wireless device 10, the request requesting the identity of the MRS handler associated with the identity of the MRS.

The first radio network node 12 may comprise a receiving module 1504, such as a receiver or the transceiver. The first radio network node 12, the processing unit 1501, and/or the receiving module 1504 is configured to receive the response from the wireless device 10, which response comprises the identity of the MRS Handler.

The first radio network node 12, the processing unit 1501, and/or the transmitting module 1503 is configured to transmit the connection request to the MRS handler for connecting to the second radio network node 13.

The first radio network node 12, the processing unit 1501, and/or the receiving module 1504 is configured to receive from the MRS handler the connection response with information enabling connection to the second radio network node 13.

The first radio network node 12 may comprise an ANR module 1505. The first radio network node 12, the processing unit 1501, and/or the ANR module 1505 may be configured to set up a neighbour relationship with the second radio network node 13 using the received information in the connection response.

The first radio network node 12, the processing unit 1501, and/or the receiving module 1504 may be configured to receive, from the wireless device 10, the measurement report which comprises a measurement value and the identity of the MRS for that measurement value. The identity may be a locally unique identity. The MRS may be a reference signal used at least for mobility purposes of wireless devices.

The first radio network node 12 further comprises a memory 1506. The memory comprises one or more units to be used to store data on, such as signal strengths or qualities, MRSs, IDs of MRS handlers, applications to perform the methods disclosed herein when being executed, and similar.

The methods according to the embodiments described herein for the first radio network node 12 are respectively implemented by means of e.g. a computer program 1507 or a computer program product, comprising instructions, i.e., software code portions, which, when executed on at least one processor, cause the at least one processor to carry out the actions described herein, as performed by the first radio network node 12. The computer program 1507 may be stored on a computer-readable storage medium 1508, e.g. a disc or similar. The computer-readable storage medium 1508, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Figure 16:
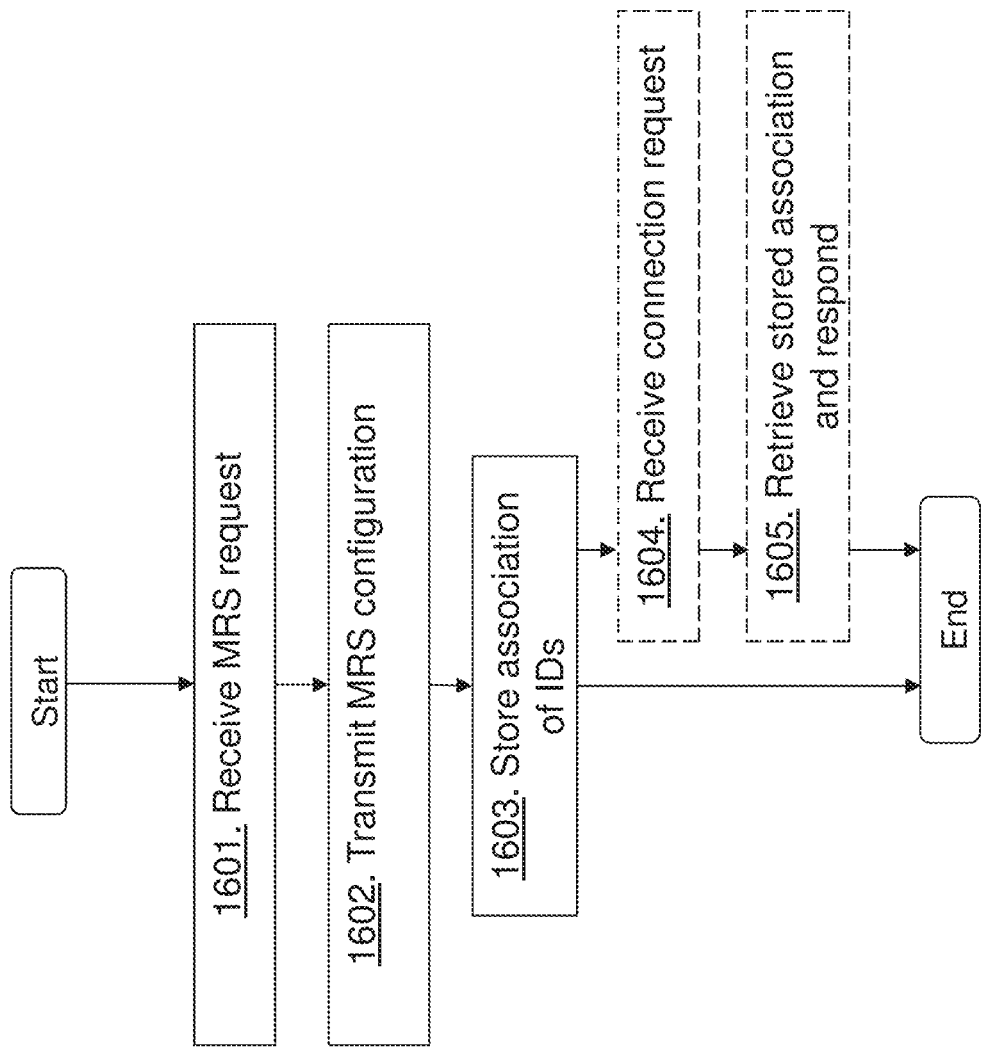
FIG. 16 shows a schematic flowchart depicting a method performed by a MRS handler according to embodiments herein.

The method actions performed by the MRS handler for handling neighbour relationship between the radio network nodes in the communication network 1 according to some embodiments will now be described with reference to a flowchart depicted in FIG. 16. The actions do not have to be taken in the order stated below, but may be taken in any suitable order.

Action 1601. The MRS handler 15 receives an MRS request from the second radio network node 13. The MRS request indicates a request for MRS configuration; e.g. MRS IDs, transmission parameters etc.

Action 1602. The MRS handler 15 transmits the MRS configuration to the requesting second radio network node 13, e.g. MRS IDs and ID of the MRS handler.

Action 1603. The MRS then stores an association mapping the MRS ID or ID of the MRS handler with identity of the second radio network node 13 requesting the MRS configuration.

Action 1604. The MRS handler 15 may then receive the connection request from the first radio network node 12, which connection request is for connecting to a radio network node with the MRS ID (applied into the connection request).

Action 1605. The MRS handler may then retrieve the stored data and respond with the identity of the second radio network node 13.

Figure 17:
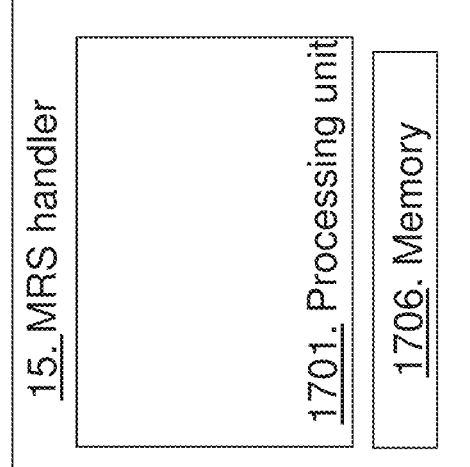
FIG. 17 is a block diagram depicting a MRS handler according to embodiments herein.
Figure 17:
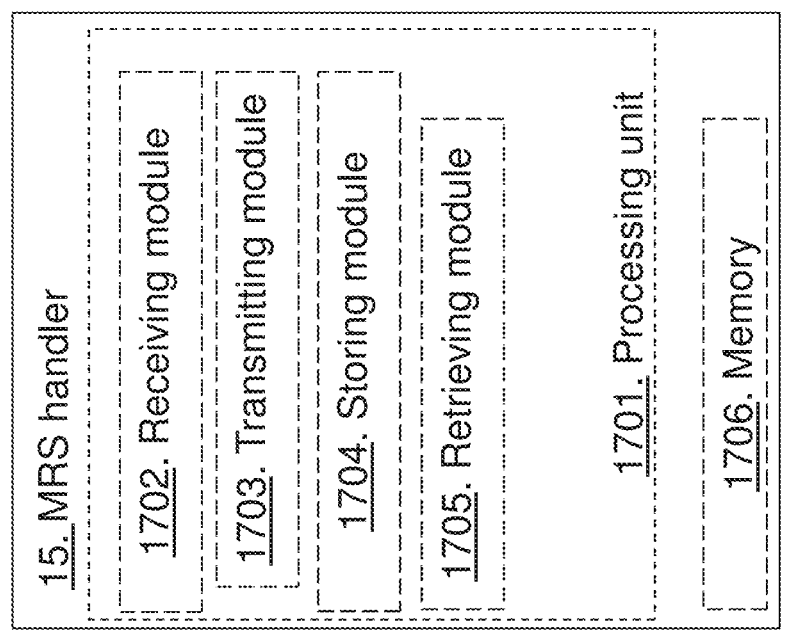
Figure 17:
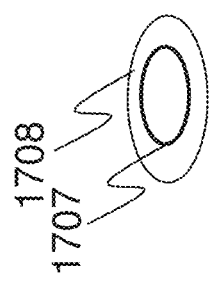

FIG. 17 is a block diagram depicting the MRS handler for handling neighbour relationships between radio network nodes according to embodiments herein. The MRS handler is a network node, such as a core network node, O&M node, or a RAN node, that knows which radio network node that is transmitting the MRS and it can e.g. provide the IP-address of that radio network node.

The MRS handler may comprise a processing unit 1701, such as one or more processors, configured to perform methods herein.

The MRS handler may comprise a receiving module 1702. The MRS handler, the processing unit 1701, and/or the receiving module 1702 may be configured to receive the MRS request from the second radio network node 13. The MRS request indicates a request for MRS configuration; e.g. MRS IDs, transmission parameters etc.

The MRS handler may comprise a transmitting module 1703. The MRS handler, the processing unit 1701, and/or the transmitting module 1703 may be configured to transmit the MRS configuration to the requesting second radio network node 13, e.g. MRS IDs and ID of the MRS handler.

The MRS handler may comprise a storing module 1704. The MRS handler, the processing unit 1701, and/or the storing module 1704 may be configured to store the association, mapping the MRS ID or ID of the MRS handler with identity of the second radio network node requesting the MRS configuration.

The MRS handler, the processing unit 1701, and/or the receiving module 1702 may be configured to receive the connection request from the first radio network node, which connection request is for connecting to a radio network node with the MRS ID (applied into the connection request).

The MRS handler may comprise a retrieving module 1705. The MRS handler, the processing unit 1701, and/or the retrieving module 1705 may be configured to retrieve the stored data and respond with the identity of the second radio network node 13.

The MRS handler further comprises a memory 1706. The memory comprises one or more units to be used to store data on, such as signal strengths or qualities, MRSs, IDs of MRS handlers, IDs of radio network nodes, mappings, applications to perform the methods disclosed herein when being executed, and similar.

The methods according to the embodiments described herein for the MRS handler are respectively implemented by means of e.g. a computer program 1707 or a computer program product, comprising instructions, i.e., software code portions, which, when executed on at least one processor, cause the at least one processor to carry out the actions described herein, as performed by the MRS handler. The computer program 1707 may be stored on a computer-readable storage medium 1708, e.g. a disc or similar. The computer-readable storage medium 1708, having stored thereon the computer program, may comprise the instructions which, when executed on at least one processor, cause the at least one processor to carry out the actions described herein, as performed by the MRS handler. In some embodiments, the computer-readable storage medium may be a non-transitory computer-readable storage medium.

In some embodiments a more general term "radio-network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), core network node (e.g. Mobile Switching Centre (MSC), Mobility Management Entity (MME) etc), Operation and Maintenance (O&M), Operation Sub System OSS, Self-Organizing Network (SON), positioning node, e.g. Evolved Serving Mobile Location Center (E-SMLC), Minimization of drive tests (MDT), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G or NR. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a wireless device configured for operation in a wireless communication network, the method comprising:
    receiving a beamformed mobility reference signal (MRS) transmitted by a second radio network node and obtaining an MRS identity from the MRS, the MRS identity serving as a locally unique identity for the MRS at the second radio network node;
    sending a measurement report to a first radio network node serving the wireless device, the measurement report indicating the MRS identity;
    receiving an MRS handler identity request, as sent from the first radio network node in response to the first radio network node not recognizing the MRS identity, and, correspondingly obtaining an MRS handler identity by:
        receiving a beamformed identity signal from the second radio network node that conveys the MRS handler identity;
        recovering the MRS handler identity from the identity signal, the MRS handler identity being a network address of the second radio network node, or being a network address of another node in the wireless communication network that maintains linking information linking the MRS identity to the second radio network node, the identity signal being beamformed like the MRS and being transmitted according to a periodicity or transmission times known to the wireless device from configuration information received by the wireless device; and reporting the MRS handler identity to the first radio network node, thereby enabling the first radio network node to contact the second radio network node for establishing a neighbor relationship.

2. The method of claim 1, further comprising receiving the configuration information via signaling from the wireless communication network.

3. The method of claim 1, wherein sending the measurement report comprises sending the measurement report responsive to determining that a received signal strength or quality of the MRS exceeds a defined threshold.

4. A method performed by a radio network node configured for operation in a wireless communication network, the method comprising:

receiving a measurement report from a wireless device being served by the radio network node, the measurement report indicating a Mobility Reference Signal (MRS) identity for a beamformed MRS received by the wireless device from a further radio network node, the MRS identity serving as a locally unique identity at the further radio network node for the MRS;

sending an MRS handler identity request to the wireless device in response to not recognizing the MRS identity, requesting an MRS handler identity, the MRS handler identity being a network address of the further radio network node, or being a network address of another node in the wireless communication network that maintains linking information linking the MRS identity to the further radio network node;

receiving the MRS handler identity as reported from the wireless device;

contacting the further radio network node for establishing a neighbor relationship, using the MRS handler identity directly as the network address of the further radio network node, or using the MRS handler identity to send an MRS source request to the other network node, to obtain the network address of the further radio network node.

5. A method performed by a radio network node configured for operation in a wireless communication network, the method comprising:

transmitting a beamformed Mobility Reference Signal (MRS) that conveys an MRS identity, the MRS identity serving as a locally unique identity for the MRS at the radio network node;

transmitting, according to a configured periodicity or configured transmission times, a beamformed identity signal, the identity signal being beamformed like the MRS and conveying an MRS handler identity, the MRS handler identity being a network address of the radio network node or being a network address of another node in the wireless communication network that maintains linking information linking the MRS identity to the radio network node; and obtaining configuration information from the other node in the wireless communication network, the configuration information including at least one of: the MRS identity, the MRS handler identity, and a periodicity or transmission times to be used by the radio network node as the configured periodicity or configured transmission times for the identity signal;

wherein the MRS is one among a plurality of beamformed MRSs transmitted by the radio network node, and wherein the method further includes transmitting a beamformed identity signal for each of the MRSs, according to a correspondingly configured periodicity or configured transmission times, each such identity signal conveying the MRS handler identity.

6. The method of claim 5, further comprising obtaining configuration information from the other node in the wireless communication network, for configuring the configured periodicity or the configured transmission times, to be used for transmitting the identity signal.

7. A method performed by a network node in a wireless communication network, the method comprising:

for each of one or more radio network nodes included in a Radio Access Network (RAN) portion of the wireless communication network, and for each of one or more beamformed Mobile Reference Signals (MRSs) transmitted by the radio network node, storing linking information linking an MRS identity conveyed in the MRS to the radio network node, wherein, for each of the one or more MRSs transmitted by the radio network node, the radio network node transmits a correspondingly beamformed identity signal that conveys an MRS handler identity comprising the network address of the network node;

receiving an MRS source request from a first given one of the radio network nodes, the MRS source request having an included MRS identity and requesting identification of the radio network node associated with the included MRS identity, and correspondingly responding by returning to the first given radio network node a network address of the radio network node linked to the included MRS identity;

responding to an MRS handler identity request from a second given one of the radio network nodes, requesting the MRS handler identity to be conveyed in the one or more identity signals transmitted by the second given radio network node in correspondence with the one or more MRSs transmitted by the second given radio network node.

8. A wireless device configured for operation in a wireless communication network, the wireless device comprising:

communication interface circuitry configured for wirelessly communicating with radio network nodes in the wireless communication network; and processing circuitry operatively associated with the communication interface circuitry and configured to:

receive a beamformed mobility reference signal (MRS) transmitted by a second radio network node and obtaining an MRS identity from the MRS, the MRS identity serving as a locally unique identity for the MRS at the second radio network node;

send a measurement report to a first radio network node serving the wireless device, the measurement report indicating the MRS identity;

receive an MRS handler identity request, as sent from the first radio network node in response to the first radio network node not recognizing the MRS identity, and, correspondingly obtain an MRS handler identity by:

receiving a beamformed identity signal from the second radio network node that conveys the MRS handler identity;

recovering the MRS handler identity from the identity signal, the MRS handler identity being a network address of the second radio network node, or being a network address of another node in the wireless communication network that maintains linking information linking the MRS identity to the second radio network node, the identity signal being beamformed like the MRS and being transmitted according to a periodicity or transmission times known to the wireless device from configuration information received by the wireless device; and reporting the MRS handler identity to the first radio network node, thereby enabling the first radio network node to contact the second radio network node for establishing a neighbor relationship.

9. The wireless device of claim 8, wherein the processing circuitry is configured to receive the configuration information via signaling sent from the wireless communication network.

10. The wireless device of claim 8, wherein the processing circuitry is configured to send the measurement report responsive to determining that a received signal strength or quality of the MRS exceeds a defined threshold.

11. A radio network node configured for operation in a wireless communication network, the radio network node comprising:

first communication interface circuitry configured for wirelessly communicating with wireless devices operating in one or more coverage areas associated with the radio network node, and second communication interface circuitry configured for inter-node communication in the wireless communication network; and processing circuitry operatively associated with the first and second communication interface circuitry and configured to:

receive a measurement report from a wireless device being served by the radio network node, the measurement report indicating a Mobility Reference Signal (MRS) identity for a beamformed MRS received by the wireless device from a further radio network node, the MRS identity serving as a locally unique identity at the further radio network node for the MRS;

send an MRS handler identity request to the wireless device in response to not recognizing the MRS identity, requesting an MRS handler identity, the MRS handler identity being a network address of the further radio network node, or being a network address of another node in the wireless communication network that maintains linking information linking the MRS identity to the further radio network node;

receive the MRS handler identity as reported from the wireless device;

contact the further radio network node for establishing a neighbor relationship, using the MRS handler identity directly as the network address of the further radio network node, or using the MRS handler identity to send an MRS source request to the other network node, to obtain the network address of the further radio network node.

12. A radio network node configured for operation in a wireless communication network, the radio network node comprising:

first communication interface circuitry configured for wirelessly communicating with wireless devices operating in one or more coverage areas associated with the radio network node, and second communication interface circuitry configured for inter-node communication in the wireless communication network; and processing circuitry operatively associated with the first and second communication interface circuitry and configured to:

transmit a beamformed Mobility Reference Signal (MRS) that conveys an MRS identity, the MRS identity serving as a locally unique identity for the MRS at the radio network node; and transmit, according to a configured periodicity or configured transmission times, a beamformed identity signal, the identity signal being beamformed like the MRS and conveying an MRS handler identity, the MRS handler identity being a network address of the radio network node or being a network address of another node in the wireless communication network that maintains linking information linking the MRS identity to the radio network node;

wherein the MRS is one among a plurality of beamformed MRSs transmitted by the radio network node, and wherein the processing circuitry is configured to transmit a beamformed identity signal for each of the MRSs, according to a correspondingly configured periodicity or configured transmission times, each such identity signal conveying the MRS handler identity.

13. The radio network node of claim 12, wherein the processing circuitry is configured to obtain configuration information from the other node in the wireless communication network, for configuring the configured periodicity or the configured transmission times, to be used for transmitting the identity signal.

14. The radio network node of claim 12, wherein the processing circuitry is configured to obtain configuration information from the other node in the wireless communication network, the configuration information including at least one of: the MRS identity, the MRS handler identity, and a periodicity or transmission times to be used by the radio network node as the configured periodicity or configured transmission times for the identity signal.

15. A network node configured for operation in a wireless communication network, the network node comprising:

communication interface circuitry for communicating with respective radio network nodes included in a Radio Access Network (RAN) portion of the wireless communication network; and processing circuitry operatively associated with the communication interface circuitry and configured to:

for each of one or more of the respective radio network nodes, and for each of one or more beamformed Mobile Reference Signals (MRSs) transmitted by the radio network node, store linking information linking an MRS identity conveyed in the MRS to a network address of the radio network node, wherein, for each of the one or more MRSs transmitted by the radio network node, the radio network node transmits a correspondingly beamformed identity signal that conveys an MRS handler identity comprising a network address of the network node;

receive an MRS source request from a first given one of the radio network nodes, the MRS source request having an included MRS identity and requesting identification of the radio network node associated with the included MRS identity, and correspondingly respond by returning to the first given radio network node the network address of the radio network node linked to the included MRS identity; and respond to an MRS handler identity request from a second given one of the radio network nodes, requesting the MRS handler identity to be conveyed in the one or more identity signals transmitted by the second given radio network node in correspondence with the one or more MRSs transmitted by the second given radio network node.

* * * * *